(12) United States Patent
Ono

(10) Patent No.: US 6,873,252 B2
(45) Date of Patent: Mar. 29, 2005

(54) ANTITHEFT APPARATUS AND ANTITHEFT AUXILIARY DEVICE

(75) Inventor: Kouhei Ono, Hyogo (JP)

(73) Assignee: Fujitsu Ten Limited, Kobe (JP)

(*) Notice: Subject to any disclaimer, the term of this patent is extended or adjusted under 35 U.S.C. 154(b) by 109 days.

(21) Appl. No.: 10/460,475

(22) Filed: Jun. 13, 2003

(65) Prior Publication Data

US 2004/0075553 A1 Apr. 22, 2004

(30) Foreign Application Priority Data

Jun. 27, 2002 (JP) .................................. 2002-187788

(51) Int. Cl.[7] .............................................. B60Q 1/00
(52) U.S. Cl. ............... 340/436; 340/426.16; 340/539.1; 340/568.1; 307/9.1; 307/10.1
(58) Field of Search ............................ 340/426.16, 436, 340/539.1, 539.15, 539.17, 539.21, 539.3, 568.1; 307/9.1, 10.1, 10.2

(56) References Cited

U.S. PATENT DOCUMENTS

| | | | | |
|---|---|---|---|---|
| 4,818,998 A | * | 4/1989 | Apsell et al. | 342/444 |
| 4,978,946 A | * | 12/1990 | Nordholm et al. | 340/573.1 |
| 5,223,815 A | | 6/1993 | Rosenthal et al. | |
| 5,708,417 A | * | 1/1998 | Tallman et al. | 340/539.23 |
| 5,917,423 A | * | 6/1999 | Duvall | 340/825.37 |
| 6,160,481 A | * | 12/2000 | Taylor, Jr. | 340/573.4 |
| 6,198,390 B1 | * | 3/2001 | Schlager et al. | 340/540 |
| 6,236,936 B1 | * | 5/2001 | Berstis et al. | 701/213 |
| 6,265,974 B1 | * | 7/2001 | D'Angelo et al. | 340/568.1 |
| 6,282,491 B1 | | 8/2001 | Bochmann et al. | |
| 6,335,679 B1 | * | 1/2002 | Thomas et al. | 340/426.13 |

FOREIGN PATENT DOCUMENTS

| | | |
|---|---|---|
| JP | A 7-334437 | 12/1995 |
| JP | A 10-301166 | 11/1998 |
| WO | WO 92/21112 | 11/1992 |
| WO | WO 98/15075 | 4/1998 |

* cited by examiner

Primary Examiner—Daniel Wu
Assistant Examiner—Samuel J. Walk
(74) Attorney, Agent, or Firm—Oliff & Berridge, PLC

(57) ABSTRACT

An antitheft apparatus installed in a vehicle A includes determination unit for transferring data to and from at least one different vehicle B, C in a state in which it should not move and determining whether or not the vehicle A exists on the periphery of the different vehicle B, C based on the response state of the different vehicle B, C to a response request sent from the vehicle A, and emergency handling unit for determining that an emergency such as theft of the vehicle A occurs and performing predetermined emergency handling if the determination unit determines that the vehicle A does not exist on the periphery of the different vehicle B, C.

34 Claims, 15 Drawing Sheets

*FIG. 3*

|   | ID CODE | POSITION |
|---|---------|----------|
| 1 | A10375  | $(x_1, y_1)$ |
| 2 | A12412  | $(x_2, y_2)$ |
| 3 | A15644  | $(x_3, y_3)$ |
| 4 | A19853  | $(x_4, y_4)$ |
| 5 | A13769  | $(x_5, y_5)$ |

ANTITHEFT APPARATUS AND ANTITHEFT AUXILIARY DEVICE

The present disclosure relates to the subject matter contained in Japanese Patent Application No. 2002-187788 filed on Jun. 27, 2002, which is incorporated herein by reference in its entirety.

BACKGROUND OF THE INVENTION

1. Field of the Invention

This invention relates to an antitheft apparatus and an antitheft auxiliary device and more particularly to an antitheft apparatus for preventing theft of a mobile unit such as a vehicle and an antitheft auxiliary device for transferring data to and from the antitheft apparatus, thereby aiding in preventing the mobile unit from being stolen.

2. Description of the Related Art

Both the number of occurrences and the occurrence rate of incidents of vehicle theft, a raid on a car, etc., tend to increase and therefore in recent years, various theft prevention systems and antitheft apparatus for preventing vehicle theft have been proposed.

For example, available are a theft prevention system for monitoring parked vehicles in a parking lot, etc., with a camera, etc., installed therein and calling emergency facilities of a police, a security company, etc., immediately when vehicle theft occurs and an antitheft apparatus for sounding an alarm such as a siren or blinking a lamp, etc., when the door lock of a vehicle or window glass such as front or rear window glass is broken.

However, if a vehicle parked in a place where a theft prevention system capable of monitoring and calling as described above is not installed (for example, a dry riverbed, a vacant lot, etc.,) is stolen, taking action is very delayed; this is a problem. As for the antitheft apparatus, if the antitheft apparatus is broken, taking action is also delayed; this is a problem.

SUMMARY OF THE INVENTION

It is therefore an object of the invention to provide an antitheft apparatus capable of taking rapid action if a mobile unit such as a vehicle is stolen and an antitheft auxiliary device for transferring data to and from the antitheft apparatus, thereby aiding in preventing the mobile unit from being stolen To the end, according to a first aspect of the invention, an antitheft apparatus installed in a mobile unit prevents the mobile unit from getting stolen. The antitheft apparatus includes a communication unit, a communication control unit for transmitting and receiving data to and from a counterpart using the communication unit when the mobile unit is set in a security mode, the communication control unit for transmits a response request signal to the counterpart, a presence determination unit for determining as to whether or not another mobile unit being set in the security mode exists in a predetermined area, on the basis of a response signal to the response request signal from the counterpart, and an emergency handling unit for conducting a predetermined emergency process when the presence determination unit determines that the another mobile unit does not exist in the predetermined area.

Since the communication unit is used for a short range, to cause the data transmitted from the mobile unit (response request) to arrive at the antitheft auxiliary device placed on the immobile unit or the different antitheft apparatus installed in the different mobile unit, the mobile unit needs to exist on the periphery of the immobile unit or the different mobile unit. Thus, when the mobile unit does not exist on the periphery of the immobile unit or the different mobile unit, if the response request is sent, it does not arrive at the immobile unit or the different mobile unit and therefore a response to the response request is not made by the antitheft auxiliary device or the different antitheft apparatus, of course.

In other words, if a response to the response request is received, it means that the mobile unit exists on the periphery of the immobile unit or the different mobile unit. Therefore, whether or not the mobile unit exists on the periphery of the immobile unit or the different mobile unit can be determined based on the response state of the antitheft auxiliary device or the different antitheft apparatus to the response request. For example, if the antitheft auxiliary device or the different antitheft apparatus does not make a response to the response request a predetermined number of times, it can be determined that the mobile unit does not exist on the periphery of the immobile unit or the different mobile unit.

Therefore, although initially the mobile unit exists on the periphery of the immobile unit or the different mobile unit and a response to the response request sent from the mobile unit is made by the antitheft auxiliary device or the different antitheft apparatus, if the response is not made midway, it can be determined that the mobile unit disappears from the periphery of the immobile unit or the different mobile unit.

The case where the mobile unit disappears from the periphery of the immobile unit is the case where the mobile unit moves away from the immobile unit. From the fact that the mobile unit moves while the security mode is set, it can be concluded that the mobile unit is moved by illegal operation rather than regular operation.

Therefore, when the security mode is set, if the mobile unit disappears from the periphery of the immobile unit (namely, the mobile unit moves), it can be determined that an emergency such as theft of the mobile unit occurs.

On the other hand, the case where the mobile unit disappears from the periphery of the different mobile unit in the state in which it should not move (for example, vehicle in which the security mode is set) is the case where at least either of the mobile unit and the different mobile unit moves and they are away from each other. From the fact that the mobile unit or the different mobile unit moves while the security mode is set, it can be concluded that the mobile unit or the different mobile unit is moved by illegal operation rather than regular operation, as described above.

Therefore, when the security mode is set, if the mobile unit disappears from the periphery of the different mobile unit in the state in which it should not move (namely, at least either of the mobile unit and the different mobile unit moves), it can be determined that an emergency such as theft of the mobile unit or the different mobile unit occurs.

Which of the mobile unit and the different mobile unit is stolen can be determined based on the tire condition of the mobile unit, position information indicated by a GPS signal, etc. For example, if the tires rotate, it indicates that the mobile unit moves and therefore the mobile unit is determined to be stolen; on the other hand, if the tires do not rotate, it indicates that the mobile unit does not move and therefore the different mobile unit can be determined to be stolen.

Thus, in the antitheft apparatus of the first aspect, data is transferred between the antitheft apparatus installed in the mobile unit and the antitheft auxiliary device placed on the immobile unit or the different antitheft apparatus installed in the different mobile unit, whereby whether or not an emergency such as theft of the mobile unit occurs can be determined. Further, if it is determined that an emergency occurs, the predetermined emergency handling (for example, report to a police, etc.,) is performed, so that if theft of the mobile unit, etc., occurs in any other than a parking lot in which a monitor camera, etc., is installed, rapid action can be taken for the theft.

Also, in the antitheft apparatus of the first aspect, even if data is not transferred between the antitheft apparatus installed in the mobile unit and the antitheft auxiliary device placed on the immobile unit such as a utility pole or a signal, if data can be transferred between the antitheft apparatus installed in the mobile unit and the different antitheft apparatus installed in the different mobile unit, whether or not an emergency such as theft of the mobile unit occurs can be determined and therefore the antitheft auxiliary device placed on the immobile unit is not indispensable.

According to a second aspect of the invention, the predetermined area is an area in a predetermined radius of the mobile unit.

According to a third aspect of the invention, the predetermined area is an area in a predetermined radius of an antitheft auxiliary unit provided in an immobile unit.

According to a fourth aspect of the invention, the antitheft apparatus of the first aspect further includes a communication start request unit for transmitting a communication start request signal to the counterpart using the communication unit and a reply unit for transmitting a reply signal to the communication start request signal to the counterpart using the communication unit, when the communication start request signal is transmitted from the counterpart and the communication control unit accepts the communication start request signal.

In the antitheft apparatus of the fourth aspect, to find out a counterpart for executing data transfer, a communication start request signal is transmitted and if a communication start request sent from the different antitheft apparatus can be accepted, a reply signal to the communication start request is transmitted to the different antitheft apparatus.

As the communication start request signal and the reply signal thereto are transferred, the mate for executing data transfer is determined, so that data transfer for monitoring each other can be started.

According to a fifth aspect of the invention, in any one of the first to fourth aspects, the antitheft apparatus further includes a communication termination request unit for transmitting to the counterpart a signal indicating a request for communication termination using the communication unit.

If one terminates the data transfer without leave, there is the fear of erroneously determining that vehicle theft occurs. However, according to the antitheft apparatus (3), to terminate the data transfer, a communication termination request signal can be transmitted to the mate to inform the mate of the communication termination, so that occurrence of the above-mentioned problem can be avoided. According to a sixth aspect of the invention, the antitheft apparatus of any of the first to fifth aspects further includes a response request timing setting unit for setting a timing of transmitting the response request signal. The communication control unit transmits the response request signal to the counterpart in accordance with the set timing.

It seems that the time for which the mobile unit (for example, vehicle) is parked in the parking lot at the user's home and the time for which the mobile unit is parked in the parking lot in a restaurant to take a meal differ largely in length. If the same timing is applied although the parking times entirely differ, it is feared that various disadvantages (for example, remarkable lowering of the battery capacity) will occur.

The antitheft apparatus of the sixth aspect makes it possible to set the timing of making the response request; for example, the apparatus enables the user to set the timing, so that occurrence of the disadvantages, etc., can be circumvented.

According to a seventh aspect of the invention, in the sixth aspect, the response request timing setting unit sets the timing on the basis of environment information concerning the mobile unit.

In the seventh aspect, the timing is automatically set based on the environment information concerning the mobile unit, such as the battery capacity. For example, the timing is set based in response to the battery capacity, whereby remarkable lowering of the battery capacity can be prevented.

According to an eighth aspect of the invention, in any of the first to seventh aspects, the presence determination unit determines that the another mobile unit does not exist in the predetermined area, when the response signal to the response request signal is not transmitted from the counterpart during a first predetermined time period.

In the eighth aspect, if a response of the antitheft auxiliary device placed on the immobile unit and/or the different antitheft apparatus installed in the different mobile unit to the response request is not received in a predetermined time period, it is determined that the mobile unit does not exist on the periphery of the immobile unit or on the periphery of the different mobile unit, so that occurrence of an emergency such as theft of the mobile unit can be detected with good accuracy.

According to a ninth aspect of the invention, in the eighth aspect, the antitheft apparatus further includes a first time period setting unit for setting the first predetermined time period. The presence determination unit makes the determination in accordance with the first predetermined time period set by the first time period setting unit.

As the predetermined time period becomes shorter, the detection level of occurrence of an emergency is raised (namely, occurrence of an emergency can be detected rapidly, but the possibility of erroneous detection is raised); on the other hand, as the predetermined time period becomes longer, the detection level of occurrence of an emergency is lowered (namely, occurrence of an emergency cannot rapidly be detected, but the possibility of erroneous detection is lowered).

The antitheft apparatus of the ninth aspect makes it possible to set the predetermined time period; for example, the apparatus enables the user to set the predetermined time period, so that the detection level of occurrence of an emergency can be set as desired by the user.

According to a tenth aspect of the invention, the presence determination unit determines that the another mobile unit does not exist in the predetermined area, when the response signal to the response request signal is not transmitted from the counterpart predetermined number of times.

In the tenth aspect, if a response of the antitheft auxiliary device placed on the immobile unit and/or the different antitheft apparatus installed in the different mobile unit to the response request is not received a predetermined number of times, it is determined that the mobile unit does not exist on the periphery of the immobile unit and/or on the periphery of the different mobile unit, so that occurrence of an emergency such as theft of the mobile unit can be detected with good accuracy.

According to an eleventh aspect of the invention, in the tenth aspect, the antitheft apparatus further includes a number-of-times setting unit for setting the predetermined number of times. The presence determination unit makes the determination in accordance with the predetermined number of times set by the number-of-times setting unit.

As the predetermined number of times lessens, the detection level of occurrence of an emergency is raised (namely, occurrence of an emergency can be detected rapidly, but the possibility of erroneous detection is raised); on the other hand, as the predetermined number of times increases, the detection level of occurrence of an emergency is lowered (namely, occurrence of an emergency cannot rapidly be detected, but the possibility of erroneous detection is lowered).

The antitheft apparatus of the eleventh aspect makes it possible to set the predetermined number of times; for example, the apparatus enables the user to set the predetermined number of times, so that the detection level of occurrence of an emergency can be set as desired by the user.

According to a twelfth aspect of the invention, in any of the first to eleventh aspects, the antitheft apparatus according, further includes an identification code storage unit for storing an identification code which identifies the counterpart. The communication control unit transmitting and receiving the data to and from the counterpart using the identification code stored in the identification code storage unit.

In the twelfth aspect, the identification code is used to transfer data to and from the antitheft auxiliary device placed on the immobile unit and/or the different antitheft apparatus installed in the different mobile unit, so that a plurality of one-to-one correspondences for transferring data can be constructed.

For example, one vehicle A can transfer data to and from not only another vehicle B, but also still another vehicle C, as later described with reference to FIG. 6. Thus, if a response to the response request is not received from either of the vehicle B and C, the antitheft apparatus installed in the vehicle A can determine that an emergency occurs.

Accordingly, for example, if both the vehicles A and B are stolen at a time and are conveyed together, the distance between the vehicles A and B does not widen and the vehicle A can receive a response of the vehicle B to the response request and therefore cannot detect an emergency occurring from transferring data to and from the vehicle B, but can detect an emergency occurring from transferring data to and from the vehicle C. Therefore, a plurality of one-to-one correspondences for transferring data are constructed, whereby occurrence of an emergency can be detected with still better accuracy. According to a thirteenth aspect of the invention, in any of the first to twelfth aspects, the antitheft apparatus further includes a security mode setting unit for setting the mobile unit in the security mode when the security mode setting unit determines that a second predetermined time period has elapsed since a user conduct a predetermined action.

In the thirteenth aspect, when the predetermined time period has elapsed since predetermined execution of the user (for example, removing the engine key from the key cylinder or stopping the engine), the security mode is set. That is, the security mode is not set immediately after the predetermined execution of the user, but the security mode is set after the expiration of the predetermined time period, so that the security mode can be prevented from being set more than necessary.

According to a fourteenth aspect of the invention, in the thirteenth aspect, the antitheft apparatus further includes a second time period setting unit for setting the second predetermined time period. The security mode setting unit makes the determination in accordance with the second predetermined time period set by the second time period setting unit to set the mobile unit in the security mode.

The antitheft apparatus of the fourteenth aspect makes it possible to set the predetermined time period; for example, the apparatus enables the user to set the predetermined time period, so that the setting timing of the security mode can be set as desired by the user.

According to a fifteenth aspect of the invention, in any of the first to fourteenth aspects, the antitheft apparatus further includes a first security mode cancel unit for canceling the security mode when the first security mode cancel unit determines that a third predetermined time period has elapsed since a user conducts a predetermined action and the mobile unit is set in the security mode.

In the fifteenth aspect, when the predetermined time period has elapsed since predetermined execution of the user (for example, inserting the engine key into the key cylinder or starting the engine), the security mode is canceled. That is, the security mode is not canceled immediately after the predetermined execution of the user, but the security mode is canceled after the expiration of the predetermined time period. Thus, for example, if a thief of the vehicle steals the engine key from the formal driver of the vehicle and attempts to immediately drive off with the stolen engine key, the security mode is not canceled and therefore the theft of the vehicle can be detected.

According to a sixteenth aspect of the invention, in the fifteenth aspect, the antitheft apparatus further includes a third time period setting unit for setting the third predetermined time period. The first security mode cancel unit makes the determination in accordance with the third predetermined time period set by the third time period setting unit to cancel the security mode.

As the security mode is canceled after the expiration of the predetermined time period since the predetermined execution of the user as describe early, theft occurrence, etc., can be detected with good accuracy if the engine key, etc., is stolen. However, even the formal driver would have to wait for expiration of the predetermined time period; it is feared that the driver may feel troublesome.

The antitheft apparatus of the sixteenth aspect makes it possible to set the predetermined time period; for example, the apparatus enables the user to set the predetermined time period, so that the cancel timing of the security mode can be set as desired by the user. Therefore, feeling troublesome can be eliminated or reduced.

According to a seventeenth aspect of the invention, in any of the first to sixteenth aspects, the antitheft apparatus further includes a lock code storage unit for storing a lock code used to cancel the security mode, and a second security mode cancel unit for canceling the security mode when a predetermined condition is satisfied. The predetermined condition includes a condition that a code input by a user matches the lock code stored in the lock code storage unit.

In the seventeenth aspect, unless the user enters the valid lock code, the security mode is not canceled, so that safety can be still more enhanced.

According to an eighteenth aspect of the invention, in the seventeenth aspect, the antitheft apparatus further includes a lock code rewrite unit for writing a new code input by the user into the lock code storage unit to update the lock code.

The antitheft apparatus of the eighteenth aspect enables the user to set any desired lock code, so that safety can be still more improved, of course, and in addition, the user can set an easy-to-remember code as the lock code.

According to a nineteenth aspect of the invention, in any of the first to eighteenth aspects, the emergency handling unit notifies an occurrence of an emergency to surrounding of the mobile unit when the presence determination unit determines that the another mobile unit does not exist in the predetermined area.

In the nineteenth aspect, if it is determined that an emergency such as theft of the mobile unit occurs, a warning, etc., is generated and the head lamps, etc., are lighted. That is, as a warning is generated and the head lamps are lighted, the surrounding persons can be alerted to the theft of the mobile unit, of course, and in addition, the advantage of making the thief give up the vehicle theft, etc., can also be provided; crime prevention can be very enhanced.

According to a twentieth aspect of the invention, in any of the first to nineteenth aspects, the emergency handling unit transmits a signal indicating an occurrence of an emergency to a periphery of the mobile unit using the communication unit, when the presence determination unit determines that the another mobile unit does not exist in the predetermined area.

In the twentieth aspect, if it is determined that an emergency such as theft of the mobile unit occurs, a signal indicating occurrence of the emergency is transmitted to the periphery using the communication unit. That is, the signal can be transmitted to a different mobile unit existing on the periphery of the mobile unit. Therefore, as the signal is received in the different mobile unit, it can be recognized that an emergency such as vehicle theft occurs on the periphery, so that it is made possible to take some action.

According to a twenty-first aspect of the invention, in the twentieth aspect, the antitheft apparatus further includes a notification unit for notifying the occurrence of the emergency on the periphery of the mobile unit to surrounding of the mobile unit upon reception of the signal indicating the occurrence of the emergency.

In the twenty-first aspect, upon reception of the signal, a warning, etc., is generated and the head lamps, etc., are lighted. That is, a warning is generated and the head lamps are lighted not only from the mobile unit, but also from different mobile units on the periphery, so that crime prevention can be still more enhanced.

According to a twenty-second aspect of the invention, any of the first to twenty-first aspects, the antitheft apparatus further includes a mobile unit communication device for wide range communication. The emergency handling unit determines whether or not the mobile unit falls into an emergency, on the basis of mobile unit information concerning the mobile unit. The emergency handling unit transmits emergency information indicating that the mobile unit falls into the emergency to at least one of an emergency facility using the mobile unit communication device and a periphery of the mobile unit using the communication unit, when the emergency handling unit determines that the mobile unit falls into the emergency.

In the twenty-second aspect, if it is determined that the mobile unit falls into an emergency such as theft (for example, the tires of the mobile unit rotate or the position information of the mobile unit changes) based on the mobile unit information concerning the mobile unit (for example, tire condition, position information indicated by a GPS signal), emergency information indicating that the mobile unit falls into an emergency is transmitted to emergency facilities of a police, etc., using a mobile unit communication device capable of conducting wide-area communications (for example, a mobile telephone) or the emergency information is transmitted to the periphery (namely, a nearby different mobile unit) using the communication unit for a short range.

Therefore, if the mobile unit falls into an emergency such as theft, emergency information is transmitted to a police etc., using a mobile telephone, etc., so that rapid action can be taken against the theft. If a mobile telephone, etc., is not installed in the mobile unit or the mobile unit is in a dead spot, the communication unit can be used to transmit emergency information to the different mobile unit, so that it is also made possible to report the emergency to a police, etc., through the different mobile unit, and very strong safety can be ensured.

According to a twenty-third aspect of the invention, in the twenty-second aspect, the emergency information includes the mobile unit information.

In the twenty-third aspect, the mobile unit information concerning the mobile unit (for example, position, move direction, speed, the number of passengers, fuel capacity) is added to the emergency information transmitted to a police, etc., so that it becomes easy to identify the stolen vehicle, for example, and it is made possible to find out the vehicle at an early stage. If a GPS receiver is installed in the mobile unit, the position, the move direction, and the like of the mobile unit can be found based on a GPS signal received at the GPS receiver.

According to a twenty-fourth aspect of the invention, in the twenty-third aspect, the counterpart is a plurality of counterparts. The antitheft apparatus further includes a move direction calculation unit for calculating a move direction of the mobile unit on the basis of states of the response signals from the counterparts. The mobile unit information included in the emergency information includes information concerning the move direction of the mobile unit calculated by the move direction calculation unit.

When a vehicle 11 transfers data to and from vehicles 12 to 15 at regular or irregular intervals, if the vehicle 11 is stolen and is moved in the arrow S direction as later described with reference to in FIG. 11, a response to a response request sent from the vehicle 11 is not made in the order of the vehicles 11 to 15. In other words, if the response is not made in the order, it can be estimated that the vehicle 11 is moved in the arrow S direction.

In the twenty-fourth aspect, the move direction of the mobile unit is calculated based on the response state of a plurality of mates to the response request, and the information concerning the calculated move direction is added to the emergency information. Therefore, if no GPS receiver is installed in the mobile unit or the thief destroys the GPS receiver, the information concerning the move direction of the mobile unit can be transmitted to a police, etc.

According to a twenty-fifth aspect of the invention, in the twenty-third aspect, the mobile unit information included in the emergency information includes run path information provided as position information accumulates.

In the twenty-fifth aspect, the run path information of the stolen mobile unit can be sent to a police, etc., so that the possibility of securing the mobile unit at an early stage can be enhanced.

According to another aspect of the invention, in any of twenty-third to twenty-fifth aspects, the emergency handling unit transmits the emergency information to which the updated mobile unit information is added to the emergency facilities and/or the outside.

In another aspect, in addition to the emergency information just after the emergency occurs, the emergency information to which the updated mobile unit information is added is transmitted to a police, etc., so that the police, etc., can acquire the updated, very useful mobile unit information (for example, position, move direction, speed, fuel capacity). Therefore, it becomes very easy to identify the stolen vehicle, and it is made possible to find out the vehicle at a still earlier stage.

According to a twenty-sixth aspect of the invention, any of the first to twenty-fifth aspects, the emergency handling unit determines whether or not the another mobile unit falls into an emergency, on the basis of mobile unit information concerning the mobile unit. The emergency handling unit transmits emergency information indicating that the another mobile unit falls into the emergency to at least one of an emergency facility and a periphery of the mobile unit using the communication unit, when the emergency handling unit determines that the another mobile unit falls into the emergency.

In the twenty-sixth aspect, if it is determined that the different mobile unit falls into an emergency such as theft (for example, the tires of the mobile unit do not rotate or the position information of the mobile unit does not change) based on the mobile unit information concerning the mobile unit (for example, tire condition, position information indicated by a GPS signal), emergency information indicating that the different mobile unit falls into an emergency is transmitted to emergency facilities of a police, etc., using a mobile unit communication device capable of conducting wide-area communications (for example, a mobile telephone) or the emergency information is transmitted to the periphery (namely, a nearby different mobile unit) using the communication unit for a short range.

Therefore, if the different mobile unit falls into an emergency such as theft, emergency information is transmitted to a police etc., using a mobile telephone, etc., so that rapid action can be taken against the theft. If a mobile telephone, etc., is not installed in the mobile unit or the mobile unit is in a dead spot, the communication unit can be used to transmit emergency information to a different mobile unit, so that it is also made possible to report the emergency to a police, etc., through this different mobile unit, and very strong safety can be ensured.

Although it is feared that the thief may destroy not only the communication device installed in the stolen vehicle, but also the antitheft apparatus, a vehicle different from the stolen vehicle detects the vehicle theft occurring and a vehicle different from the stolen vehicle reports the emergency to a police, etc., so that the emergency can be reliably reported to a police, etc.

According to a twenty-seventh aspect, in the twenty-sixth aspect, the antitheft apparatus according further includes an emergency information transmission unit for transmitting the emergency information to at least one of the emergency facility and the periphery of the mobile unit using the communication unit, when the mobile unit receives the emergency information.

In the twenty-seventh aspect, upon reception of the emergency information transmitted from a nearby different mobile unit, the emergency information is transmitted to emergency facilities of a police, etc., using a mobile unit communication device capable of conducting wide-area communications (for example, a mobile telephone) or the emergency information is transmitted to the periphery (namely, a nearby different mobile unit) using the communication unit for a short range.

Therefore, for example, if the vehicle detecting occurrence of an emergency such as vehicle theft (namely, the stolen vehicle or the vehicle transferring data to and from the stolen vehicle) cannot send the emergency directly to a police, etc., using a mobile telephone, etc., it is made possible to send the emergency to a police, etc., through one or more nearby different vehicles.

According to a twenty-eighth aspect of the invention, in the twenty-seventh aspect, the emergency information transmission unit increments a count value and add the incremented count value to the emergency information.

By the way, if no limitations are placed on the process in which the mobile unit receiving the emergency information transmits the emergency information to the periphery using the communication unit for a short range, the same information is transmitted and received infinitely and there is the fear of congestion of communications and large waste.

In the twenty-eighth aspect, the emergency information to which an incremented count is added is transmitted, so that the mobile unit receiving the emergency information can understand how many mobile units the emergency information is transmitted through from the mobile unit detecting the emergency. Therefore, for example, the information transmitted through five mobile units is not transmitted to another mobile unit any more, whereby congestion of communications and large waste can be circumvented.

According to a twenty-ninth aspect of the invention, in the twenty-seventh aspect, the emergency information transmission unit determines whether or not the emergency information transmission unit transmits the emergency information on the basis of an elapsed time since a first transmission time of the emergency information.

In the twenty-ninth aspect, whether or not the emergency information is to be transmitted to the outside is determined based on the elapsed time since the first transmission time of the emergency information, namely, the transmission time of the emergency information from a first vehicle $Mc_1$ later described with reference to FIGS. 10 and 13. Therefore, it is made possible to suppress transmitting information with a lapse of long time, namely, old information to another mobile unit, so that congestion of communications and large waste can be circumvented.

According to a thirtieth aspect of the invention, in the twenty-eighth aspect, the emergency information transmission unit determines whether or not the emergency information transmission unit transmits the emergency information on the basis of distance between a first transmission point of the emergency information and a current position of the mobile unit.

In the thirtieth aspect, whether or not the emergency information is to be transmitted to the outside is determined based on the distance from the first transmission point of the emergency information, namely, the location of the first vehicle $Mc_1$ later described with reference to FIGS. 10 and 13. Therefore, it is made possible to suppress transmitting information transmitted from a too distant location to another mobile unit, so that congestion of communications and large waste can be circumvented.

According to a thirty-first aspect of the invention, in any of the first to twenty-ninth aspects, the antitheft apparatus further includes a data preparation unit for preparing data transmitted to the counterpart on the basis of a header part of data transmitted from the counterpart. The communication control unit transmits the data prepared by the data preparation unit to the counterpart.

The produce may be revised for improvement. For example, as the described antitheft apparatus is commercialized and is revised over several stages, it can be sufficiently considered that the data format used to transfer data between the antitheft apparatus will change. If it is made impossible to transfer data simply because the data format changes, there is the fear of largely degrading safety.

In the thirty-first aspect, the data transmitted to the different antitheft apparatus is prepared based on the header part of the data transmitted from the different antitheft apparatus (for example, the header part contains information indicating the type of format, etc.,). Thus, if apparatus differ in data format, data can be transferred without any problem, so that safety can be ensured.

According to a thirty-second aspect of the invention, in any of the first to thirty-first aspects, the antitheft apparatus further includes an information unit for informing a user that the counterpart to which the response request signal is to be transmitted does not exist, when it is determined that the counterpart does not exist.

As described above, to detect an emergency such as theft of the mobile unit, the mobile unit needs to transfer data to and from at least one or more different mobile units (response request and response thereto) at regular or irregular intervals. Conversely, if there is no mate for executing data transfer, an emergency cannot be detected.

In the thirty-second aspect, if it is determined that a counterpart to which the response request is to be sent does not exist, the user is informed that the mate does not exist, so that the user can be made careful so as not to be at a distance from the mobile or leave the mobile unit for a long time.

According to a thirty-third aspect of the invention, an antitheft auxiliary device transfers data to and from an antitheft apparatus. The antitheft apparatus includes a communication unit, a communication control unit for transmitting and receiving data to and from a counterpart using the communication unit when the mobile unit is set in a security mode, the communication control unit for transmits a response request signal to the counterpart, a presence determination unit for determining as to whether or not another mobile unit being set in the security mode exists in a predetermined area, on the basis of a response signal to the response request signal from the counterpart, and an emergency handling unit for conducting a predetermined emergency process when the presence determination unit determines that the another mobile unit does not exist in the predetermined area. The antitheft auxiliary device is provided in an immobile unit. The antitheft auxiliary device includes a response unit for transmitting the response signal to the response request signal, when the response unit receives the response request signal from the antitheft apparatus.

In the thirty-third aspect, a response can be made to the response request of the mobile unit, so that if a different mobile unit in which a different antitheft apparatus is installed does not exist on the periphery of the mobile unit, an emergency occurring in the mobile unit can be detected.

BRIEF DESCRIPTION OF THE DRAWINGS

In the accompanying drawings:

FIG. 3 is a drawing to show an example of a storage state of a table formed in RAM in the microcomputer in the antitheft apparatus according to the first embodiment of the invention;

DETAILED DESCRIPTION OF THE PREFERRED EMBODIMENTS

Referring now to the accompanying drawings, there are shown preferred embodiments of an antitheft apparatus and an antitheft auxiliary device according to the invention.

Figure 1:
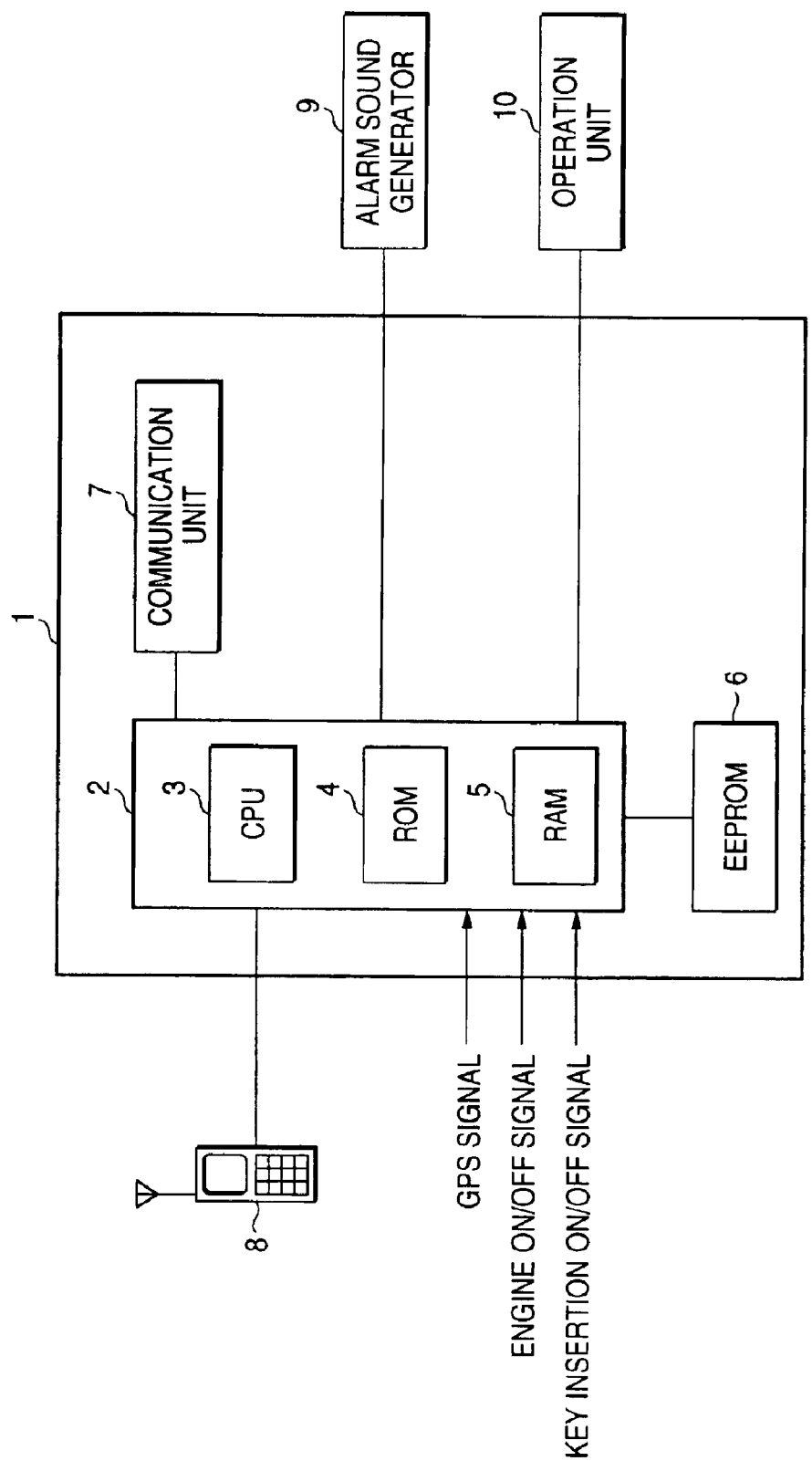
FIG. 1 is a block diagram to schematically show the main part of an antitheft apparatus according to a first embodiment of the invention.

FIG. 1 is a block diagram to schematically show the main part of an antitheft apparatus according to a first embodiment of the invention. In the figure, numeral 1 denotes the antitheft apparatus. The antitheft apparatus 1 includes a microcomputer 2 including a CPU 3, ROM 4, and RAM 5, EEPROM 6 of nonvolatile memory storing information concerning a vehicle (particular vehicle Ma) in which the antitheft apparatus 1 is installed, and a communication unit 7 for a short range involving a predetermined communication range (for example, about 10 meters). The first embodiment can use a desired range as the predetermined communication range. The EEPROM 6 stores an identification code for distinguishing the particular vehicle Ma from other vehicles, the vehicle number, vehicle type, body color, and the like of the particular vehicle Ma.

The microcomputer 2 is connected to various machines and sensors installed in the vehicle so that the microcomputer 2 can be input a GPS signal received at a GPS receiver, a signal indicating the ON/OFF state of an engine, a signal indicating whether or not an engine key is inserted into a key cylinder, and the like, for example. The microcomputer 2 is also connected to a mobile telephone 8, a warning generator 9, and an operation unit 10 to be operated by the user so that the microcomputer 2 can make an emergency call to emergency facilities of a police, etc., through the mobile telephone 8 and can control the warning generator 9 to generate warning sound.

Figure 2:
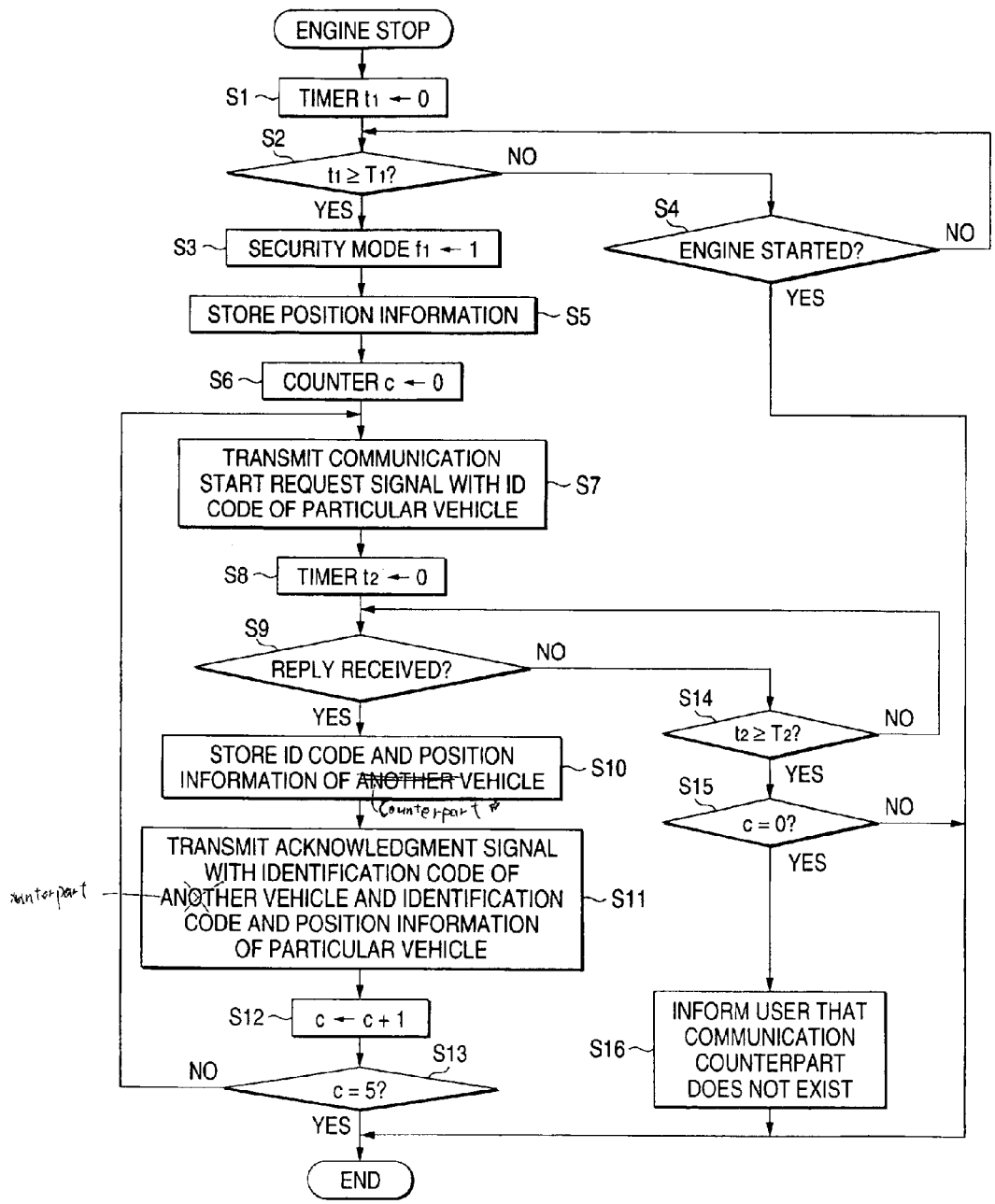
FIG. 2 is a flowchart to show processing operation of a microcomputer in the antitheft apparatus according to the first embodiment of the invention.

Next, a processing operation (1) of the microcomputer 2 in the antitheft apparatus 1 according to the first embodiment will be discussed based on a flowchart of FIG. 2. The processing operation (1) is an operation performed when a driver (user) of the particular vehicle Ma stops the engine of the particular vehicle Ma (namely, when it is detected to switch the engine from ON to OFF).

To begin with, a timer $t_1$ is set to 0 and is started (step S1). Next, it is determined whether or not the timer $t_1$ indicates that a predetermined time period $T_1$ (for example, 10 seconds) has elapsed (step S2). If it is concluded that the timer $t_1$ indicates that the predetermined time period $T_1$ has elapsed, namely, the time 10 seconds has elapsed since the engine was stopped, a security mode flag $f_1$ is set to 1 to set a security mode (step S3) and then the process goes to step S5.

On the other hand, if it is concluded that the timer $t_1$ indicates that the predetermined time period $T_1$ has not elapsed, then it is determined whether or not the user again starts the engine (step S4). If it is concluded that the engine is started, namely, the engine is again started before the expiration of 10 seconds since the engine was stopped, the processing operation (1) is terminated without setting the security mode. The purpose of providing the predetermined time period $T_1$ is to prevent the security mode from being set more than necessary.

The user may be enabled to set the predetermined time period $T_1$ as any desired value through the operation unit 10. The value set through the operation unit 10 may be stored in nonvolatile memory (not shown) separate from the EEPROM 6. The microcomputer 2 may set the security mode according to the value stored in the nonvolatile memory.

After the security mode flag $f_1$ is set to 1 (namely, the security mode is set) at step S3, position information of the particular vehicle Ma, which is obtained based on a GPS signal, is stored in the RAM 5 (step S5) and a counter c is set to 0 (step S6). Then, the communication unit 7 for a short range is used to transmit a communication start request signal including a signal indicating a communication start request and the identification code of the particular vehicle Ma to execute periodic data transfer to and from another vehicle Mx in which the security mode is set (namely, placed in a state in which the vehicle should not move) as with the particular vehicle Ma (step S7). Then, a timer $t_2$ is set to 0 and is started (step S8). Since the communication start request signal is transmitted using the communication unit 7 for a short range, vehicles, which can receive the communication start request signal, are only vehicles existing in the range of a radius of about 10 m of the particular vehicle Ma.

Figure 4:
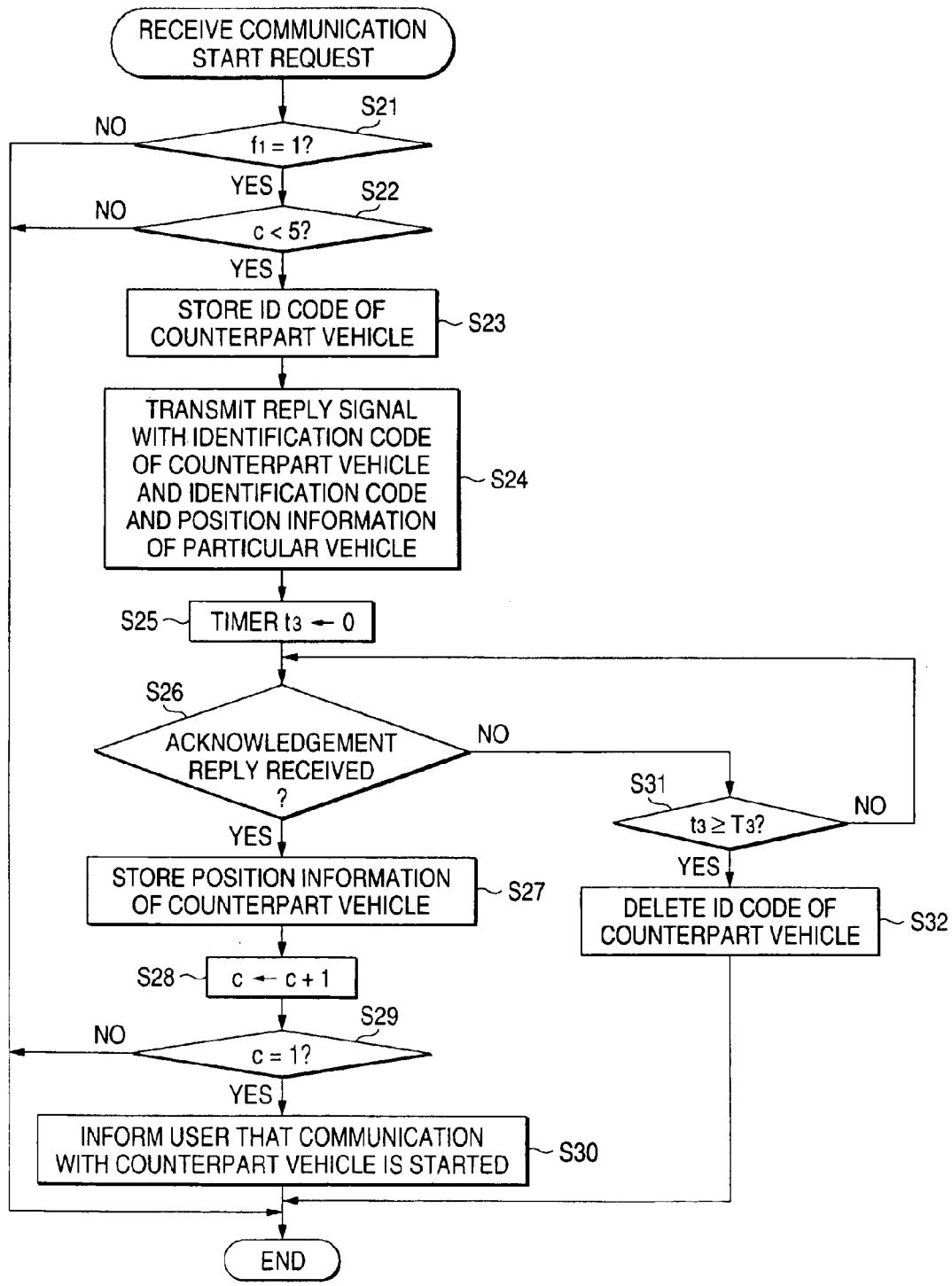
FIG. 4 is a flowchart to show processing operation of the microcomputer in the antitheft apparatus according to the first embodiment of the invention.

A processing operation performed upon reception of the communication start request signal will be discussed later in detail based on a flowchart of FIG. 4. If the another vehicle Mx receiving the communication start request signal transmitted from the particular vehicle Ma can execute periodic data transfer to and from the particular vehicle Ma, the another vehicle Mx transmits a signal including the identification code of the particular vehicle Ma, the identification code and position information of the another vehicle Mx, and information to specify the another vehicle Mx, such as the vehicle number, vehicle type, and body color of the another vehicle Mx (reply signal to the communication start request signal). The purpose of executing periodic data transfer to and from the another vehicle Mx which should not move is to detect occurrence of an emergency such as theft of the particular vehicle Ma.

Although the antitheft apparatus 1 installed in the particular vehicle Ma, etc., actually transmits and receives a signal, the expression "signal transmitted from the particular vehicle Ma" and the expression "the another vehicle Mx receiving a signal" are used for convenience to make easy description.

Next, it is determined whether or not a reply to the communication start request, namely, the reply signal is received (step S9). If it is concluded that the reply signal is received, the identification code and position information of the another vehicle Mx transmitting the reply signal and information to specify the another vehicle Mx (for example, information indicating the vehicle number, vehicle type, body color, etc.,) are stored in the RAM 5 as information concerning a counterpart vehicle Mb, which is a counterpart for executing periodic data transfer (step S10).

The RAM 5 is formed with a table for storing the identification code, position information, and specification information of the counterpart vehicle Mb. FIG. 3 shows an example wherein the identification codes and position information of the counterpart vehicles Mb are stored in the table. Here, information concerning five counterpart vehicles Mb can be stored up to five vehicles.

Next, to inform the counterpart vehicle Mb that the particular vehicle Ma receives the reply signal and to send information to specify the particular vehicle Ma, the communication unit 7 is used to transmit a signal including the identification code of the counterpart vehicle Mb, the identification code of the particular vehicle Ma, the position information of the particular vehicle Ma, and information to specify the particular vehicle Ma, such as the vehicle number, vehicle type, and body color of the particular vehicle Ma (acknowledgement signal) (step S11). Here, the number of counterpart vehicles Mb increases by one and therefore the counter c is incremented by one (step S12).

After the counter c is incremented by one, it is determined whether or not the counter c reaches 5 (step S13). If it is concluded that the counter c reaches 5, namely, the table formed in the RAM 5 is filled with data and the number of counterpart vehicles Mb stored in the table cannot be increased any more, the processing operation (1) is terminated. On the other hand, if it is concluded that the counter c does not reach 5, namely, is 4 or less and the table contains an empty area and the number of counterpart vehicles Mb stored in the table can be increased, the process returns to step S7 and again the communication start request signal is transmitted.

If it is concluded at step S9 that the reply signal to the communication start request is not received, it is determined whether or not the timer $t_2$ indicates that a predetermined time period $T_2$ (for example, one second) has elapsed (step S14). If it is concluded that the timer $t_2$ indicates that the predetermined time period $T_2$ has not elapsed, the process returns to step S9 and a wait is made for the reply signal.

The user may be enabled to set the predetermined time period $T_2$ as any desired value through the operation unit 10. The value set through the operation unit 10 may be stored in memory (not shown). The microcomputer 2 may set the security mode according to the value stored in the memory or the microcomputer 2 may be made possible to detect a radio wave condition, etc., so that the predetermined time period $T_2$ is set based on the radio wave condition.

On the other hand, if it is concluded that the timer $t_2$ indicates that the predetermined time period $T_2$ has elapsed, namely, there is no another vehicle Mx making a reply to the request signal and a counterpart for executing periodic data transfer to and from the particular vehicle Ma does not exist any more, then it is determined whether or not the counter c is 0 (step S15). If it is concluded that the counter c is 0, namely, a counterpart for executing periodic data transfer cannot be set and therefore occurrence of an emergency such as theft of the particular vehicle Ma cannot be detected, the mobile telephone 8 or the communication unit 7 is used to send a message indicating the fact to the user (step S16). On the other hand, if it is concluded that the counter c is not 0, the processing operation (1) is terminated.

Next, a processing operation (2) of the microcomputer 2 in the antitheft apparatus 1 according to the first embodiment will be discussed based on a flowchart of FIG. 4. The processing operation (2) is operation performed when the above-mentioned communication start request signal transmitted from the another vehicle Mx (see step S7 in FIG. 2) is received through the communication unit 7.

To execute periodic data transfer to and from the another vehicle Mx transmitting the communication start request signal, the security mode needs to be set (namely, the vehicle should not move). Thus, first it is determined whether or not the security mode flag $f_1$ is 1 (step S21). If it is concluded that the flag $f_1$ is 1, namely, the security mode is set, then it is determined whether or not the counter c is less than 5 (step S22).

If it is concluded that the counter c is less than 5, namely, the table formed in the RAM 5 (see FIG. 3) contains an empty area, the identification code of the another vehicle Mx contained in the communication start request signal transmitted from the another vehicle Mx is stored in the table as the identification code of a counterpart vehicle Mb as a counterpart for executing periodic data transfer (step S23).

Next, the communication unit 7 is used to transmit a signal including the identification code of the another vehicle Mx, which transmits the communication start request signal and is the counterpart vehicle Mb, the identification code and the position information of the particular vehicle Ma, and information to specify the particular vehicle Ma, such as the vehicle number, vehicle type, and body color of the particular vehicle Ma as a reply signal to the communication start request (step S24). Then, a timer $t_3$ is set to 0 and is started (step S25)

Next, it is determined whether or not an acknowledgement signal responsive to the reply signal, namely, a signal including the identification code, position information, and specification information of the another vehicle Mx, which is the counterpart vehicle Mb (see step S11 in FIG. 2), is received (step S26). If it is concluded that the acknowledgement signal is received, the position information and the specification information of the another vehicle Mx, which is the counterpart vehicle Mb, contained in the acknowledgement signal are stored in the table with associating with the identification code of the another vehicle Mx (step S27). Here, the number of counterpart vehicles Mb increases by one and therefore the counter c is incremented by one (step S28).

After the counter c is incremented by one, it is determined whether or not the counter c becomes 1 (step S29). If it is concluded that the counter c becomes 1, namely, counterpart vehicle Mb for executing periodic data transfer can be set and thus it is made possible to detect occurrence of an emergency such as theft of the particular vehicle Ma, the mobile telephone 8 or the communication unit 7 is used to send a message indicating the fact to the user (step S30). On the other hand, if it is concluded that the counter c is not 1, namely, is 2 or more, the processing operation (2) is terminated.

If it is concluded at step S26 that the acknowledgement signal responsive to the reply signal is not received, it is determined whether or not the timer $t_3$ indicates that a predetermined time period $T_3$ (for example, one second) has elapsed (step S31). If it is concluded that the timer $t_3$ indicates that the predetermined time period $T_3$ has not elapsed, the process returns to step S26 and a wait is made for the acknowledgement signal.

On the other hand, if it is concluded that the timer $t_3$ indicates that the predetermined time period $T_3$ has elapsed, namely, it is made impossible to transfer data between the particular vehicle Ma and the another vehicle Mx transmitting the communication start request signal for some reason, the identification code of the another vehicle Mx stored in the table at step S23 is deleted from the table (step S32).

If it is concluded at step S21 that the security mode flag $f_1$ is not 1, namely, the particular vehicle Ma does not satisfy a condition for executing periodic data transfer to and from the another vehicle Mx transmitting the communication start request signal, the processing operation (2) is terminated. If it is concluded at step S22 that the counter c is not less than 5, namely, is 5 and the table formed in the RAM 5 does not contain any empty area and therefore counterpart vehicle Mb cannot be added, the processing operation (2) is terminated.

Figure 5A:
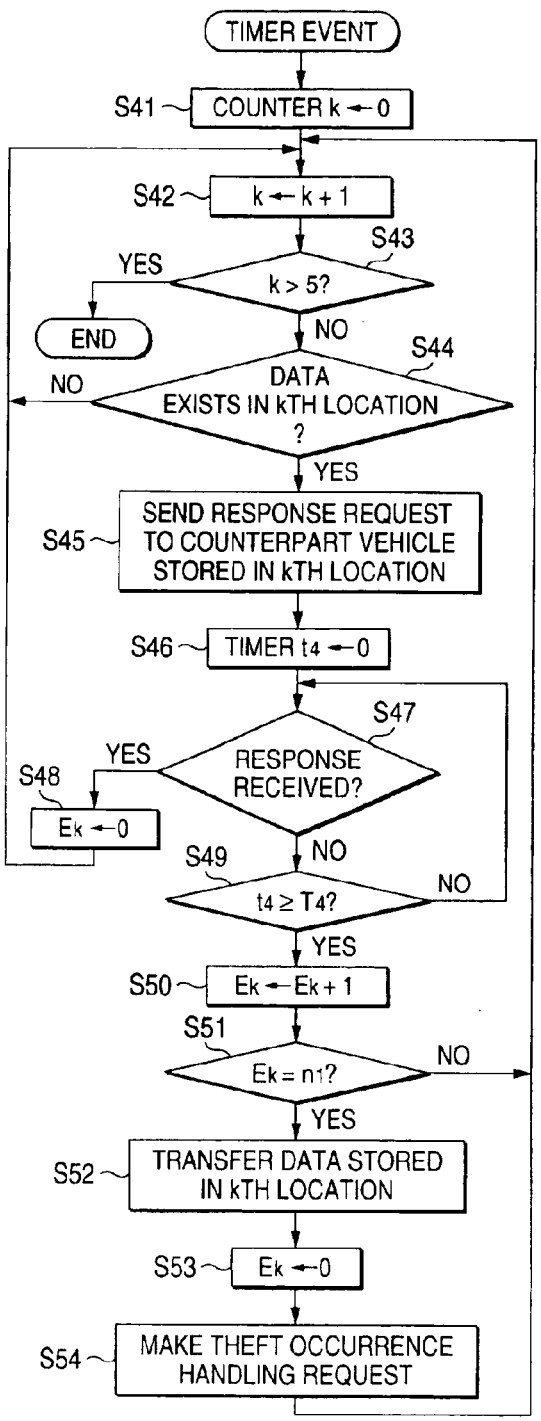
FIG. 5 is a flowchart to show processing operation of the microcomputer in the antitheft apparatus according to the first embodiment of the invention.

Next, a processing operation (3) of the microcomputer 2 in the antitheft apparatus 1 according to the first embodiment will be discussed based on a flowchart of FIG. 5A. The processing operation (3) is an operation performed every predetermined time period (for example, 10 seconds) when a counterpart vehicle Mb for executing periodic data transfer is set.

Figure 6:
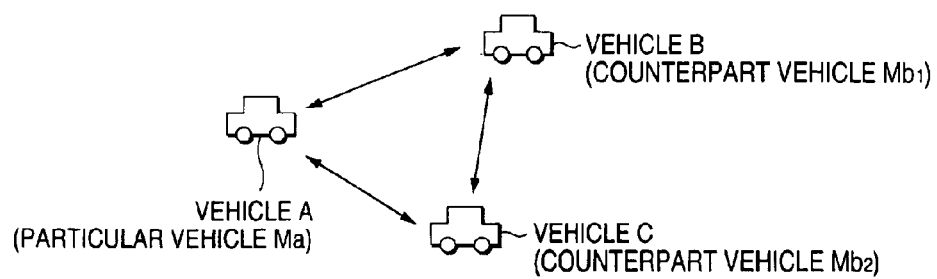
FIG. 6 is a schematic representation to describe transfer of data among vehicles.

FIG. 6 shows an example of a state in which counterpart vehicles Mb for executing periodic data transfer are set with respect to a particular vehicle. FIG. 6 shows that a vehicle A makes vehicles B and C to be counter vehicles of the vehicle A, that the vehicle B makes the vehicles A and C to be counter vehicles of the vehicle B, and that the vehicle C makes the vehicles A and B to be counter vehicles of the vehicle C. If the vehicle A is the particular vehicle Ma, the vehicles B and C become counterpart vehicles $Mb_1$ and $Mb_2$ with respect to the vehicle A.

To begin with, a counter k is set to 0 (step S41). Next, the counter k is incremented by one (step S42) and it is determined whether or not the counter k exceeds 5 (step S43). The numeric value 5 indicates the maximum number of vehicles in the information concerning counterpart vehicles Mb that can be stored in the table formed in the RAM 5 (see FIG. 3).

If it is concluded at step S43 that the counter k does not exceed 5, it is determined whether or not information concerning counterpart vehicle Mb is stored in the kth location of the table is determined (step S44). If it is concluded that information concerning counterpart vehicle Mb is not stored in the kth location, the process returns to step S42 and the counter k is incremented by one. On the other hand, if it is concluded that information concerning counterpart vehicle Mb is stored in the kth location, the communication unit 7 is used to transmit a signal including the identification code of the counterpart vehicle Mb stored in the kth location and the identification code of the particular vehicle Ma (response request signal) to send a response request to the counterpart vehicle Mb (step S45). Then, a timer $t_4$ is set to 0 and is started (step S46).

Figure 5B:
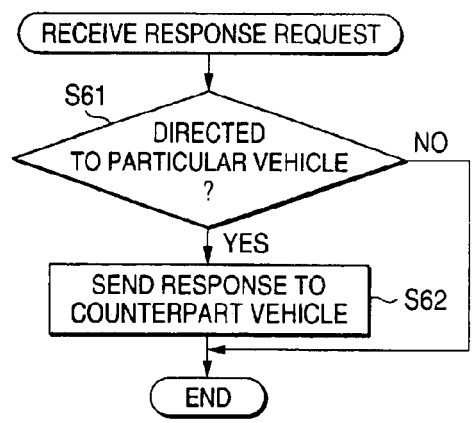

The processing operation performed upon reception of the response request signal will be discussed later in detail based on a flowchart of FIG. 5B. The counterpart vehicle Mb receiving the response request signal transmitted from the particular vehicle Ma transmits a signal including the identification code of the particular vehicle Ma, which is a data communication counterpart with respect to the counterpart vehicle Mb, and the identification code of the counterpart vehicle Mb itself (a response signal to the response request signal)

Next, it is determined whether or not a response to the response request is received from the counterpart vehicle Mb is determined (step S47). If it is concluded that a response to the response request is received, an error count $E_k$ is set to 0 (step S48) and then the process returns to step S42 and the counter k is incremented by one. At step S43, it is determined whether or not the counter k exceeds 5. If it is concluded that the counter k exceeds 5, it means that the response request is sent to all counterpart vehicles Mb stored in the table and therefore the processing operation (3) is terminated.

If it is concluded at step S47 that a response to the response request is not received, it is determined whether or not the timer $t_4$ indicates that a predetermined time period $T_4$ (for example, one second) has elapsed (step S49). If it is concluded that the timer $t_4$ indicates that the predetermined time period $T_4$ has not elapsed, the process returns to step S47 and a wait is made for a response to the response request.

On the other hand, if it is concluded that the timer $t_4$ indicates that the predetermined time period $T_4$ has elapsed, namely, a response error occurs, the error count $E_k$ is incremented by one (step S50) and it is determined whether or not the error count $E_k$ becomes $n_1$ (for example, $n_1$=3) (step S51). When a response to the response request is received, the error count $E_k$ is set to 0 (see step S48). Therefore, when the error count $E_k$ becomes $n_1$, it means that a response error has occurred successive $n_1$ times.

When a response error has occurred successive $n_1$ times rather than a single time, it is assumed that distance between the particular vehicle Ma and the counterpart vehicle Mb becomes long and the response request signal transmitted from the particular vehicle Ma does not arrive at the counterpart vehicle Mb, not because of a poor radio wave condition.

The case where the distance between the particular vehicle Ma and the counterpart vehicle Mb becomes long includes a case where either or both of the particular vehicle Ma and the counterpart vehicle Mb move. However, the particular vehicle Ma and the counterpart vehicle Mb should not move because the security mode is set in both the particular vehicle Ma and the counterpart vehicle Mb.

Figure 7A:
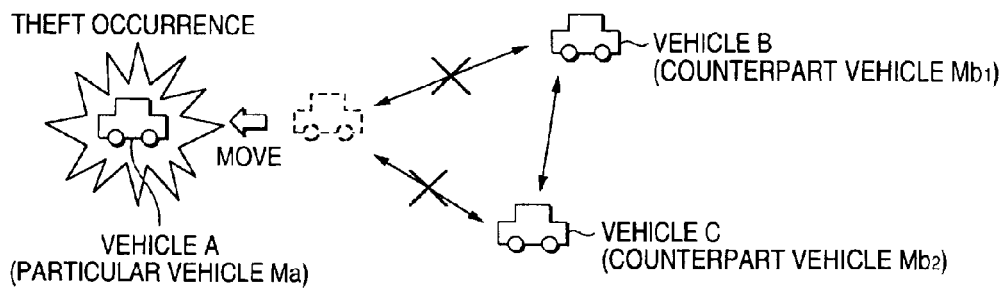
FIG. 7A is a schematic representation to describe a state in which a particular vehicle is stolen and FIG. 7B is a schematic representation to describe a state in which a counterpart vehicle is stolen.
Figure 7B:
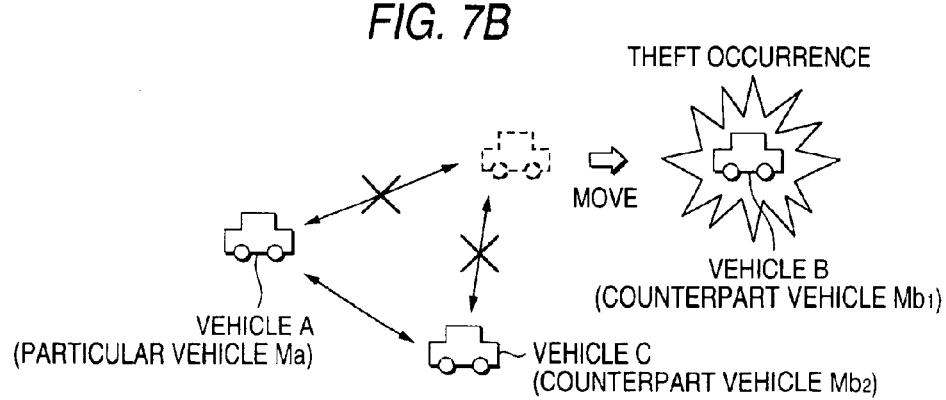

From the fact that either or both of the particular vehicle Ma and the counterpart vehicle Mb move nevertheless, it can be concluded that either or both of the particular vehicle Ma and the counterpart vehicle Mb is moved by illegal operation rather than regular operation. Thus, when the security mode is set, if the distance between the particular vehicle Ma and the counterpart vehicle Mb becomes long (namely, a response error has occurred $n_1$ successive times), it can be concluded that an emergency such as theft of the particular vehicle Ma or the counterpart vehicle Mb occurs as shown in FIGS. 7A and 7B.

Therefore, if it is concluded at step S51 that the error count $E_k$ becomes $n_1$, it is considered that theft of the particular vehicle Ma or the counterpart vehicle Mb stored in the kth location of the table occurs. Then, the information concerning the counterpart vehicle Mb stored in the kth location is transferred to another area in the RAM 5 (step S52), whereby the information is deleted from the table.

Figure 8:
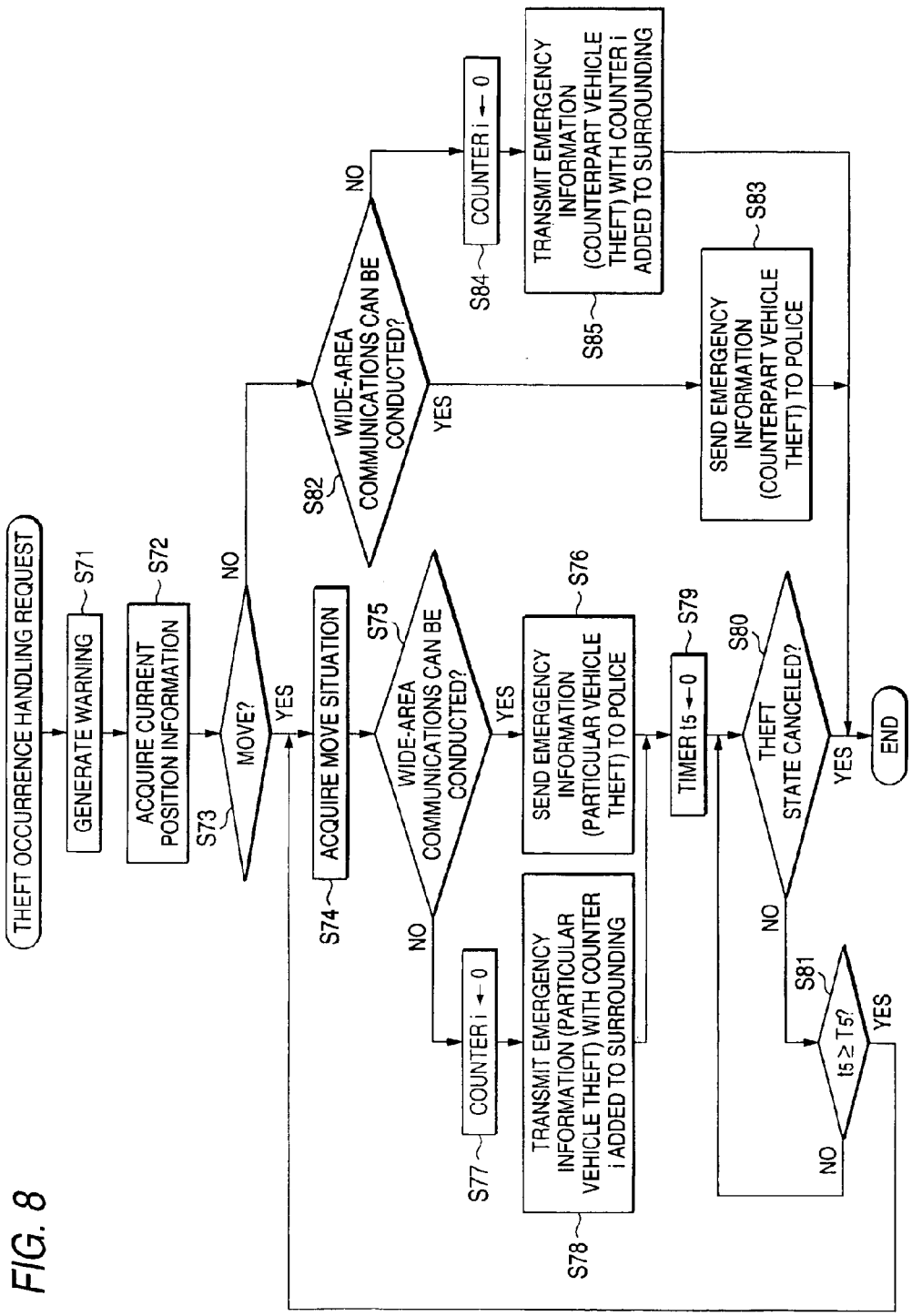
FIG. 8 is a flowchart to show processing operation of the microcomputer in the antitheft apparatus according to the first embodiment of the invention.

After the information is transferred, the error count $E_k$ is set to 0 (step S53). Next, a theft occurrence handling request is made (step S54) and then the process returns to step S42. When the theft occurrence handling request is made, a processing operation (5) later described with reference to FIG. 8 is performed. On the other hand, if it is concluded at step S51 that the error count $E_k$ is not $n_1$, a theft occurrence handling request need not be made and therefore the process returns to step S42.

The user may be enabled to set $n_1$ used to make a theft occurrence determination as any desired value through the operation unit 10, the value set through the operation unit 10 may be stored in nonvolatile memory (not shown) separate from the EEPROM 6, and the microcomputer 2 may make a theft occurrence determination according to the value stored in the nonvolatile memory or the microcomputer 2 may be made possible to detect a radio wave condition, etc., so that $n_1$ is set based on the radio wave condition.

Here, when a response error has occurred a predetermined number of times ($n_1$ times), it is concluded that an emergency such as theft of the particular vehicle Ma has occurred. However, an antitheft apparatus according to another embodiment may conclude that an emergency such as theft has occurred if a response to the response request is not received in a predetermined time period (for example, 30 seconds) rather than a predetermined number of times. The predetermined time period may also be set by the user or be changed based on the radio wave condition, etc.

Next, processing operation (4) of the microcomputer 2 in the antitheft apparatus 1 according to the first embodiment will be discussed based on a flowchart of FIG. 5B. The processing operation (4) is an operation performed when the response request signal transmitted from the counterpart vehicle to and from which periodic data transfer is executed (see step S45 in FIG. 5A) is received through the communication unit 7.

It is determined whether or not the response request is directed to the particular vehicle Ma based on the identification code contained in the response request signal transmitted from the counterpart vehicle Mb (step S61). If it is concluded that the response request is directed to the particular vehicle Ma, the communication unit 7 is used to transmit a signal including the identification code of the counterpart vehicle Mb transmitting the response request signal and the identification code of the particular vehicle Ma (response signal) as a response to the response request (step S62).

Next, a processing operation (5) of the microcomputer 2 in the antitheft apparatus 1 according to the first embodiment will be discussed based on a flowchart of FIG. 8. The processing operation (5) is operation performed when the theft occurrence handling request is made (see step S54 in FIG. 5A).

The fact that the theft occurrence handling request is made means that theft of the particular vehicle Ma or the counterpart vehicle Mb occurs. Thus, first the warning generator 9 is controlled to generate the warning sound for informing the surrounding people that vehicle theft has occurred (step S71). At this time, in addition to an auditory unit such as the warning, a visual unit such as lighting head lamps may be used.

Next, position information of the particular vehicle Ma is calculated based on a GPS signal (step S72). A comparison is made between the calculated position information and the position information of the particular vehicle Ma stored in the RAM 5 (namely, the position information of the particular vehicle Ma when the security mode is set) to determine whether or not the particular vehicle Ma moves (step S73).

If it is concluded that the particular vehicle Ma moves (see FIG. 7A), namely, the particular vehicle Ma is stolen, the move situation of the particular vehicle Ma (namely, the flight situation of the burglar) is acquired based on the GPS signal (step S74). Next, it is determined whether or not wide-area communications can be conducted, namely, the mobile telephone 8 is connected to the microcomputer 2 and is placed in a communication-possible state (step S75).

Figure 9:
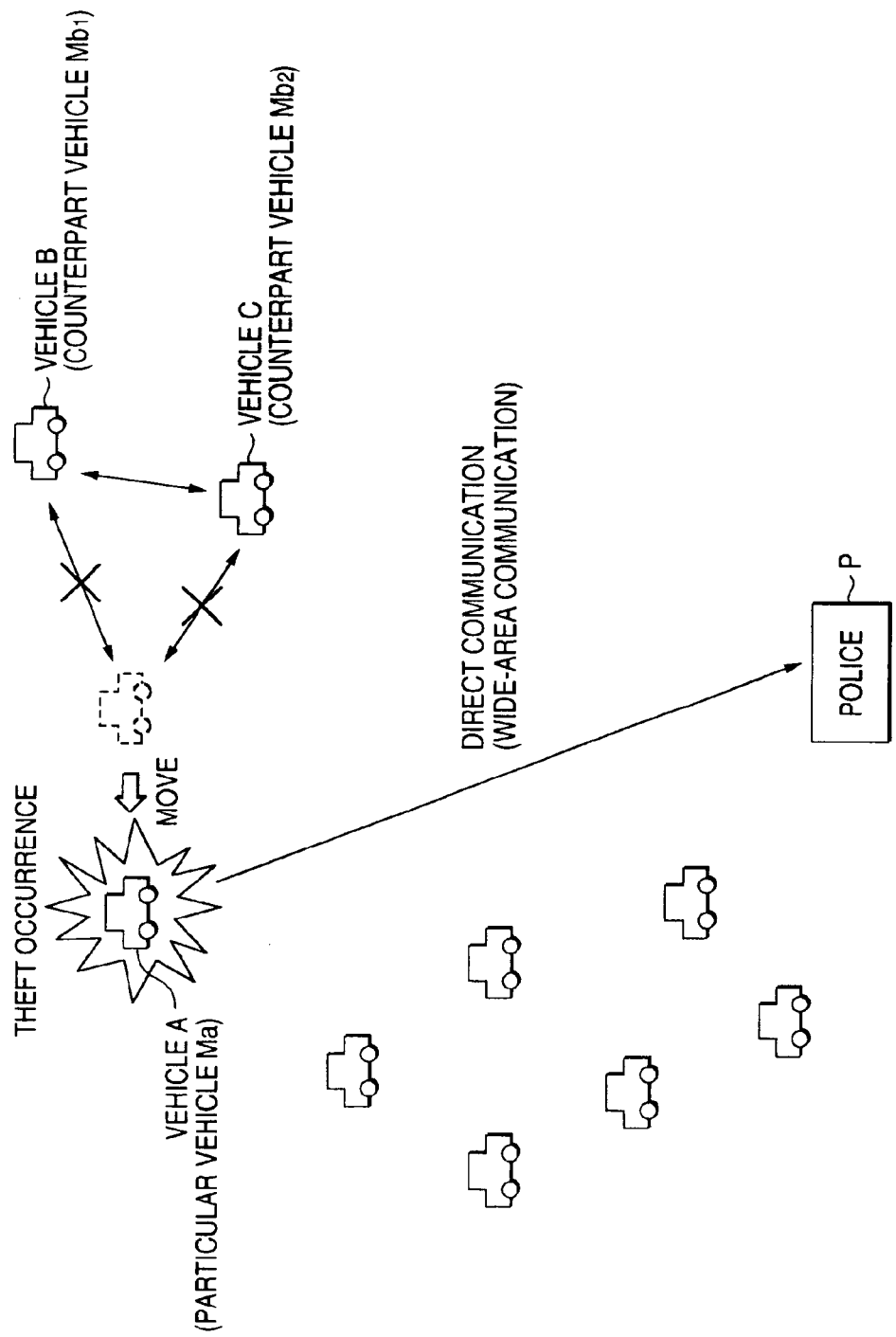
FIG. 9 is a schematic representation to describe a method of informing a police, etc., that vehicle theft occurs.

If it is concluded that wide-area communications can be conducted, a signal including information to specify the particular vehicle Ma, such as the identification code, vehicle number, vehicle type, and body color of the particular vehicle Ma stored in the EEPROM 6 and information concerning the move situation of the particular vehicle Ma acquired at step S74 is sent directly to emergency facilities of a police P, etc., using the mobile telephone 8 as an emergency signal indicating emergency information meaning that the particular vehicle Ma falls into an emergency as shown in FIG. 9 (step S76) and then a timer $t_5$ is set to 0 and is started (step S79).

Figure 10:
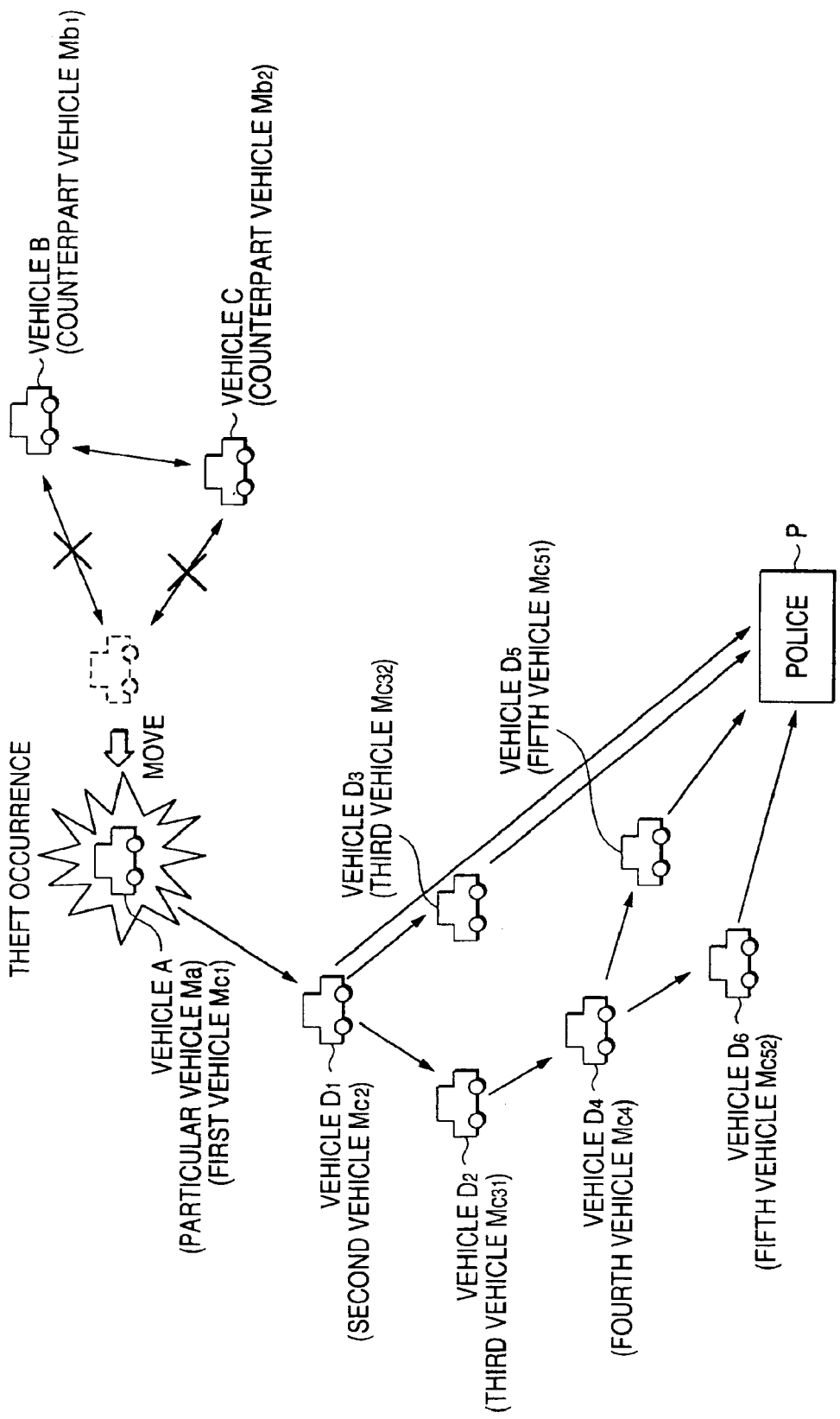
FIG. 10 is a schematic representation to describe a method of informing a police, etc., that vehicle theft occurs.

On the other hand, if it is concluded that wide-area communications cannot be conducted, a counter i is set to 0 (step S77) and the emergency information with the counter i added is transmitted using the communication unit 7 for a short range (step S78) and then the timer $t_5$ is set to 0 and is started (step S79). The emergency information is transmitted using the communication unit 7 for a short range, whereby the emergency information can be transmitted to a vehicle $D_1$ existing in the surroundings of the particular vehicle Ma as shown in FIG. 10 (the vehicle $D_1$ is not limited to a vehicle having the relationship of executing periodic data transfer to and from the particular vehicle Ma). Preferably, transmission of the emergency information at step S78 is repeated for a predetermined time period for the purposes of reliably transmitting the emergency information to another vehicle and raising the possibility that the emergency information will arrive at two or more vehicles.

Here, a vehicle detecting that the vehicle theft occurs and first transmitting the emergency information (particular vehicle Ma) is represented as a first vehicle $Mc_1$ and a vehicle (vehicle $D_1$) receiving the emergency information transmitted from the first vehicle $Mc_1$ is represented as second vehicle $Mc_2$. A processing operation performed upon reception of the emergency information will be discussed later in detail based on a flowchart of FIG. 14. Upon reception of the emergency information, the emergency information is transmitted furthermore to still another vehicle (for example, from the vehicle $D_1$ to vehicle $D_2$, $D_3$) as required; the vehicle receiving the emergency information transmitted from the mth vehicle is represented as (m+1)th vehicle.

Next, it is determined whether or not the particular vehicle Ma is secured and the theft state is canceled (step S80). If it is concluded that the theft state is canceled, the processing operation (5) is terminated. On the other hand, if it is concluded that the theft state is not canceled, it is determined whether or not the timer $t_5$ indicates that a predetermined time period $T_5$ (for example, 20 seconds) has elapsed (step S81). To determine whether or not the theft state is canceled, for example, a method of determining whether or not the formal owner of the particular vehicle Ma performs predetermined entry operation is available.

If it is concluded at step S81 that the timer $t_5$ indicates that the predetermined time period $T_5$ has elapsed, the process returns to step S74 and processing for transmitting the emergency information is again performed. On the other hand, if it is concluded that the timer $t_5$ indicates that the predetermined time period $T_5$ has not elapsed, the process returns to step S80.

Here, as the information concerning the stolen particular vehicle Ma, the information to specify the particular vehicle Ma, such as the identification code, vehicle number, vehicle type, and body color of the particular vehicle Ma and the information concerning the move situation of the particular vehicle Ma are sent to the police P, etc. However, in an anti theft apparatus according to another embodiment, it may be made possible to input various pieces of information to the microcomputer 2 and information indicating not only the position and move direction of the particular vehicle Ma, but also the speed, the number of passengers, the remaining fuel amount, etc., may be sent to the police P, etc.

The move direction of the particular vehicle Ma can be calculated based on the position information obtained from a GPS signal, etc., and can also be calculated based on the response state of a plurality of counterpart vehicles Mb to the response request sent from the particular vehicle Ma.

Figure 11:
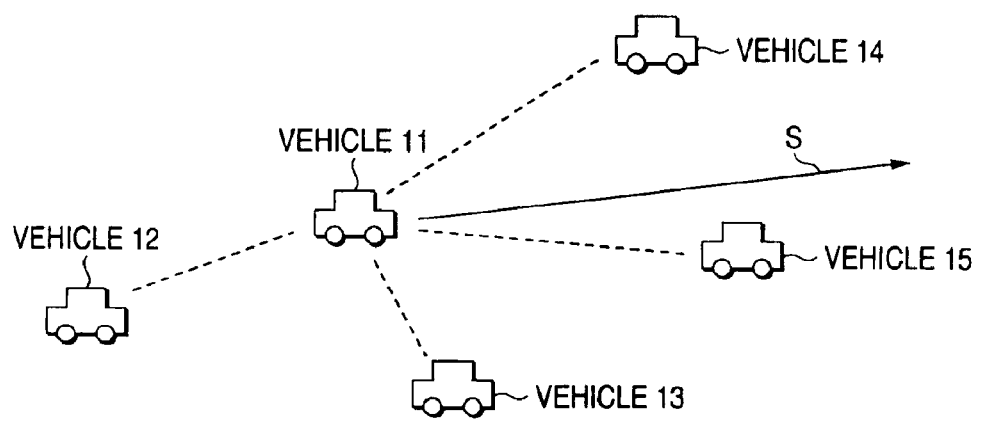
FIG. 11 is a schematic representation to describe a move direction calculation method to find the move direction of a stolen vehicle based on the response state from counterpart vehicles.

For example, it is assumed that a vehicle 11 transfers data to and from vehicles 12 to 15 as shown in FIG. 11. If the vehicle 11 is stolen and is moved in an arrow S direction, responses to the response request sent from the vehicle 11 are not made in an order of the vehicles 11 to 15. In other words, if the responses are not made in the order, it can be estimated that the vehicle 11 is moved in the arrow S direction.

If it is concluded at step S73 that the particular vehicle Ma does not move, namely, the counterpart vehicle Mb rather than the particular vehicle Ma moves and is stolen (see FIG. 7B), then it is determined whether or not wide-area communications can be conducted, namely, the mobile telephone 8 is connected to the microcomputer 2 and is placed in a communication-possible state is determined (step S82).

Figure 12:
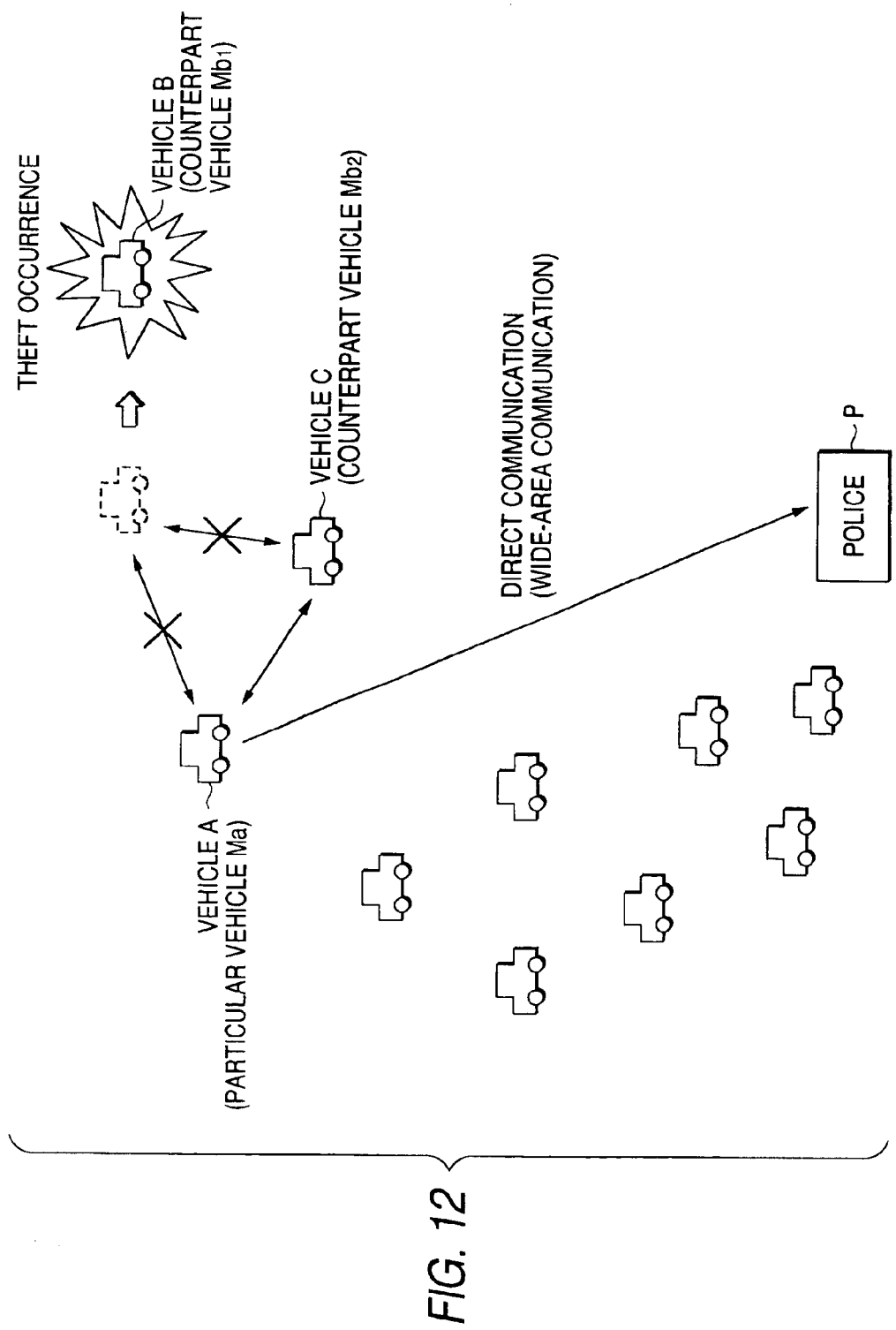
FIG. 12 is a schematic representation to describe a method of informing a police, etc., that vehicle theft occurs.

If it is concluded that wide-area communications can be conducted, a signal including the identification code of the stolen counterpart vehicle Mb, position information of the theft occurring point, and information to specify the counterpart vehicle Mb, such as the vehicle number, vehicle type, and body color of the counter part vehicle Mb is sent directly to emergency facilities of the police P, etc., using the mobile telephone 8 as an emergency signal indicating emergency information meaning that the counterpart vehicle Mb falls into an emergency as shown in FIG. 12 (step S83).

Figure 13:
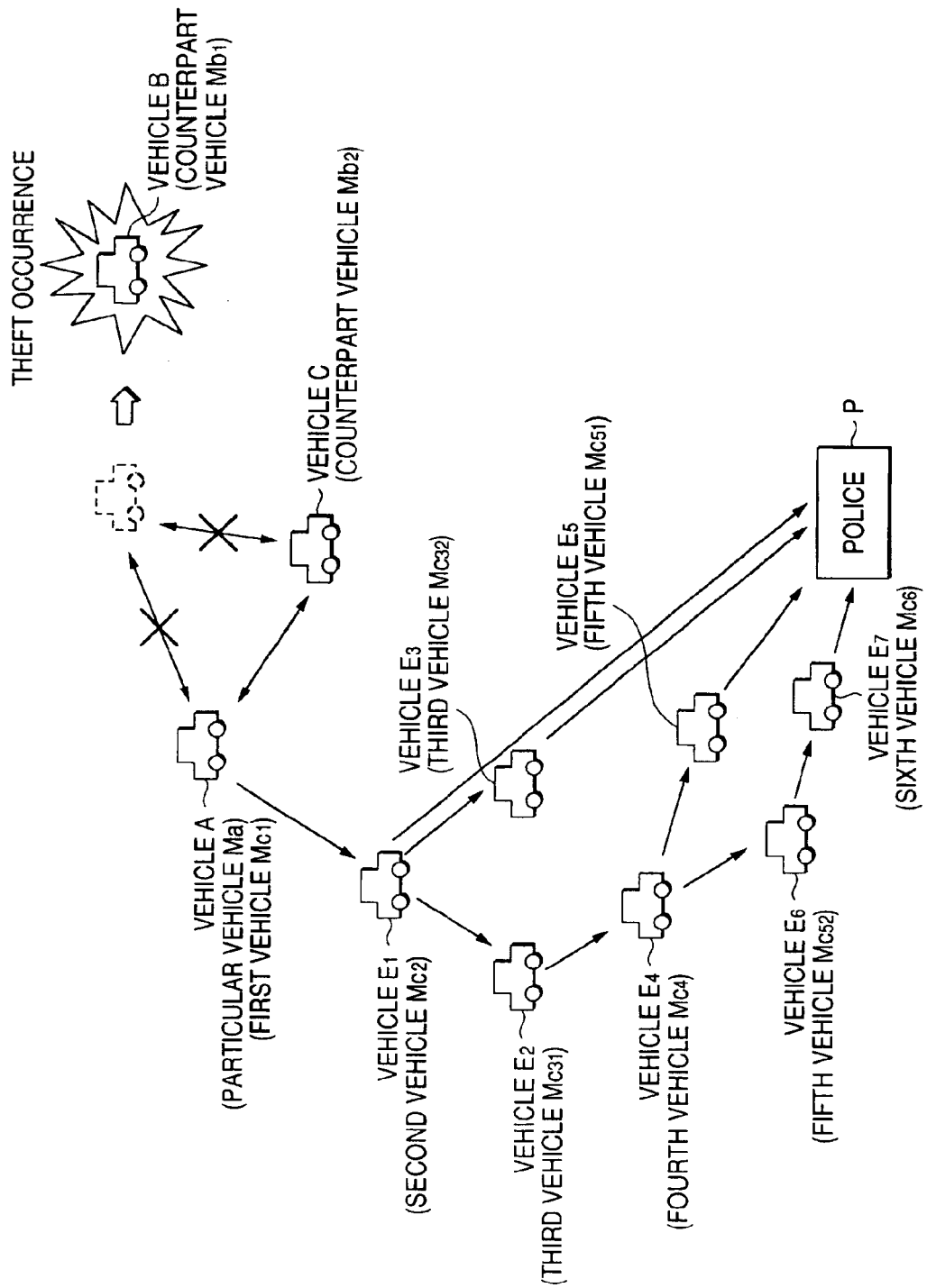
FIG. 13 is a schematic representation to describe a method of informing a police, etc., that vehicle theft occurs.

On the other hand, if it is concluded that wide-area communications cannot be conducted, the counter i is set to 0 (step S84) and the emergency information with the counter i added is transmitted using the communication unit 7 for a short range (step S85), whereby the emergency information can be transmitted to a vehicle $E_1$ (second vehicle $Mc_2$) existing in the surroundings of the particular vehicle Ma (first vehicle $Mc_1$) as shown in FIG. 13 (the vehicle $E_1$ is not limited to a vehicle having the relationship of executing periodic data transfer to and from the particular vehicle Ma). Preferably, transmission of the emergency information at step S85 is repeated for a predetermined time period for the purposes of reliably transmitting the emergency information to another vehicle and raising the possibility that the emergency information will arrive at two or more vehicles.

Here, it is determined whether or not the particular vehicle Ma moves based on the position information provided from a GPS signal. However, an antitheft apparatus according to another embodiment may determine whether or not the particular vehicle Ma moves based on the operation state of the engine, the rotation state of tires, etc.

Figure 14:
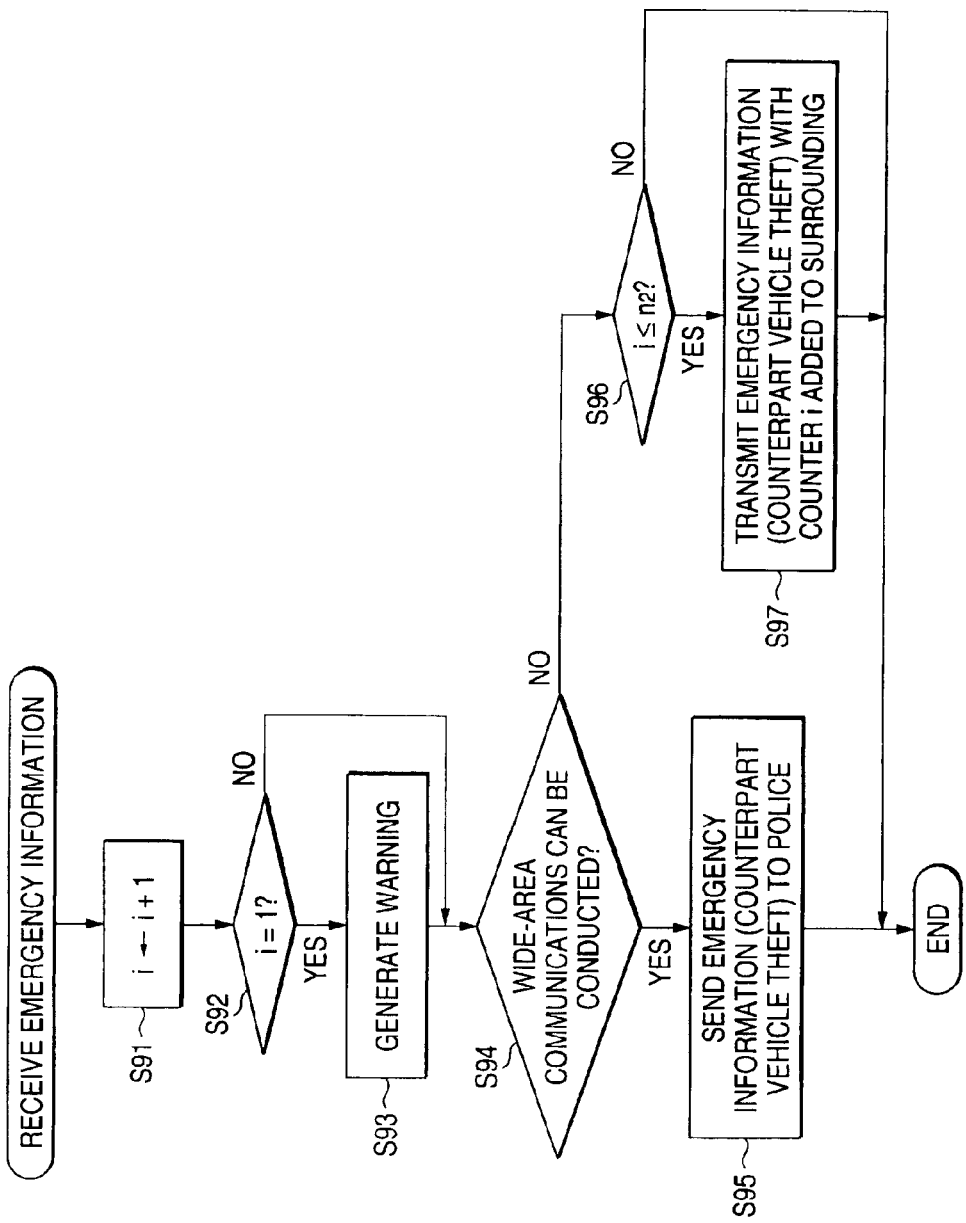
FIG. 14 is a flowchart to show processing operation of the microcomputer in the antitheft apparatus according to the first embodiment of the invention.

Next, a processing operation (6) of the microcomputer 2 in the antitheft apparatus 1 according to the first embodiment will be discussed based on a flowchart of FIG. 14. The processing operation (6) is an operation performed when the emergency information transmitted from another vehicle (see steps S78 and S85 in FIG. 8) is received through the communication unit 7.

First, the counter i transmitted along with the emergency information is incremented by one (step S91) and then it is determined whether or not the counter i incremented by one is 1 (step S92). If it is concluded that the counter i is 1, namely, the emergency information is received directly from the first vehicle $Mc_1$ (see FIGS. 10 and 13) and vehicle theft occurs in the surroundings thereof, the warning generator 9 is controlled to generate a warning sound for informing the surrounding people that vehicle theft has occurred (step S93) and then the process goes to step S94. At this time, in addition to an auditory unit such as the warning sound, a visual unit such as lighting head lamps may be used.

On the other hand, it is concluded that the counter i is not 1 (2 or more), namely, the emergency information is received via the second vehicle $Mc_2$, etc., not directly from the first vehicle $Mc_1$, step S93 is skipped and the process goes to step S94.

Next, it is determined whether or not wide-area communications can be conducted, namely, the mobile telephone 8 is connected to the microcomputer 2 and is placed in a communication-possible state (step S94). If it is concluded that wide-area communications can be conducted, the received emergency information is sent to emergency facilities of the police P, etc., using the mobile telephone 8 (step S95). Whereby, if the emergency information cannot be sent directly to the police, etc., from the first vehicle $Mc_1$, the emergency information can be sent to the police via the second vehicle $Mc_2$, the third vehicle $Mc_3$, etc.

On the other hand, if it is concluded that wide-area communications cannot be conducted, it is determined whether or not the counter i is equal to or less than $n_2$ (for example, $n_2=7$) (step S96). If it is concluded that the counter i is equal to or less than $n_2$, namely, the emergency information transmitted from any of the first vehicle $Mc_1$ to the seventh vehicle $Mc_7$ is received, the communication unit 7 is used to furthermore transmit the emergency information to which the counter i is added to another vehicle (step S97). Preferably, transmission of the emergency information at step S97 is repeated for a predetermined time period for the purposes of reliably transmitting the emergency information to another vehicle and raising the possibility that the emergency information will arrive at two or more vehicles.

On the other hand, if it is concluded at step S96 that the counter i is greater than $n_2$, namely, the emergency information transmitted from the eighth vehicle $Mc_8$ is received, to avoid congestion of communications, etc., the processing operation (6) is terminated without transmitting the emergency information furthermore to another vehicle.

Figure 15:
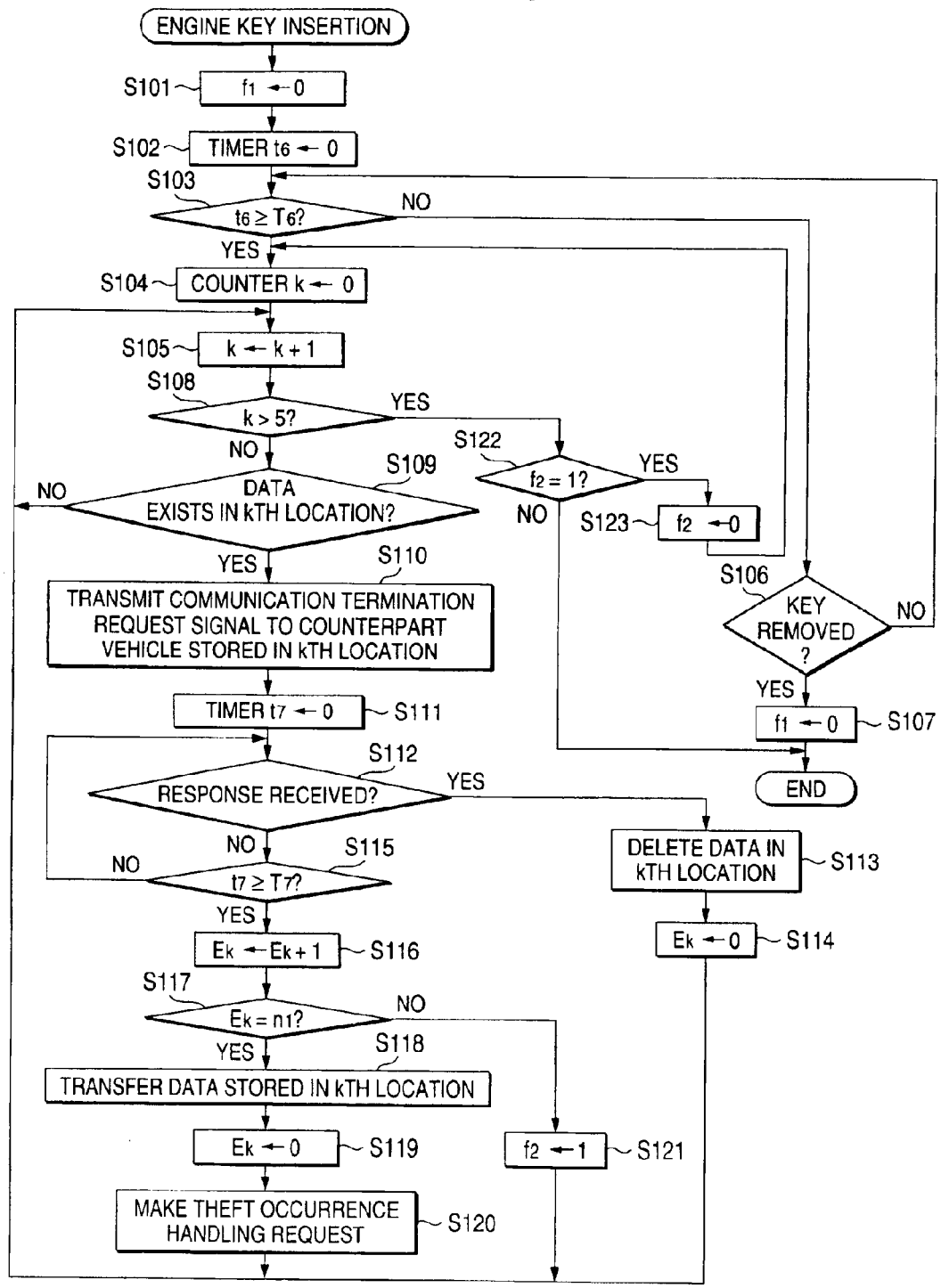
FIG. 15 is a flowchart to show processing operation of the microcomputer in the antitheft apparatus according to the first embodiment of the invention.

Next, a processing operation (7) of the microcomputer 2 in the antitheft apparatus 1 according to the first embodiment will be discussed based on a flowchart of FIG. 15. The processing operation (7) is an operation performed when a driver (user) of the particular vehicle Ma inserts the engine key into the key cylinder of the particular vehicle Ma (namely, when it is detected that a signal indicating insertion of the engine key into the key cylinder is changed from OFF to ON).

To begin with, the security mode flag $f_1$ is set to 0 (step S101) and a timer $t_6$ is set to 0 and is started (step S102). Next, it is determined whether or not the timer $t_6$ indicates that a predetermined time period $T_6$ (for example, 10 seconds) has elapsed (step S103). If it is concluded that the timer $t_6$ indicates that the predetermined time period $T_6$ has elapsed, namely, the time 10 seconds has elapsed since the user inserted the engine key into the key cylinder, the counter k is set to 0 (step S104). Next, the counter k is incremented by one (step S105) and then the process goes to step S108.

On the other hand, if it is concluded that the timer $t_6$ indicates that the predetermined time period $T_6$ has not elapsed, then it is determined whether or not the user removes the engine key from the key cylinder (step S106). If it is concluded that the engine key is removed from the key cylinder, namely, the engine key is again removed before the expiration of 10 seconds since the engine key was inserted, the security mode flag $f_1$ is restored to 1 (step S107) and the processing operation (7) is terminated. On the other hand, if it is concluded that the engine key is not removed from the key cylinder, the process returns to step S103.

The user may be enabled to set the predetermined time period $T_6$ as any desired value through the operation unit 10, the value set through the operation unit 10 may be stored in nonvolatile memory (not shown) separate from the EEPROM 6, and the microcomputer 2 may release the security mode according to the value stored in the nonvolatile memory.

In an antitheft apparatus according to another embodiment, a lock code may be registered in advance and may be compared with the code entered through the operation unit 10, etc., and a match between the lock code and the entered code may be added to the release condition of the security mode. The user may be enabled to replace the lock code with a code entered through the operation unit 10, etc., as the user performs predetermined operation.

After the counter k is incremented by one at step S105, it is determined whether or not the counter k incremented by one exceeds 5 (step S108). The numeric value 5 indicates the maximum number of vehicles in the information concerning counterpart vehicles Mb that can be stored in the table formed in the RAM 5 (see FIG. 3).

If it is concluded at step S108 that the counter k does not exceed 5, it is determined whether or not information concerning a counter part vehicle Mb is stored in the kth location of the table (step S109). If it is concluded that information concerning the counterpart vehicle Mb is not stored in the kth location, the process returns to step S105 and the counter k is incremented by one. On the other hand, if it is concluded that information concerning counterpart vehicle Mb is stored in the kth location, the communication unit 7 is used to transmit a signal including the identification code of the counterpart vehicle Mb stored in the kth location and the identification code of the particular vehicle Ma (communication termination request signal) for sending a data transfer termination request to the counterpart vehicle Mb (step S110). Then, a timer $t_7$ is set to 0 and is started (step S111).

Figure 16:
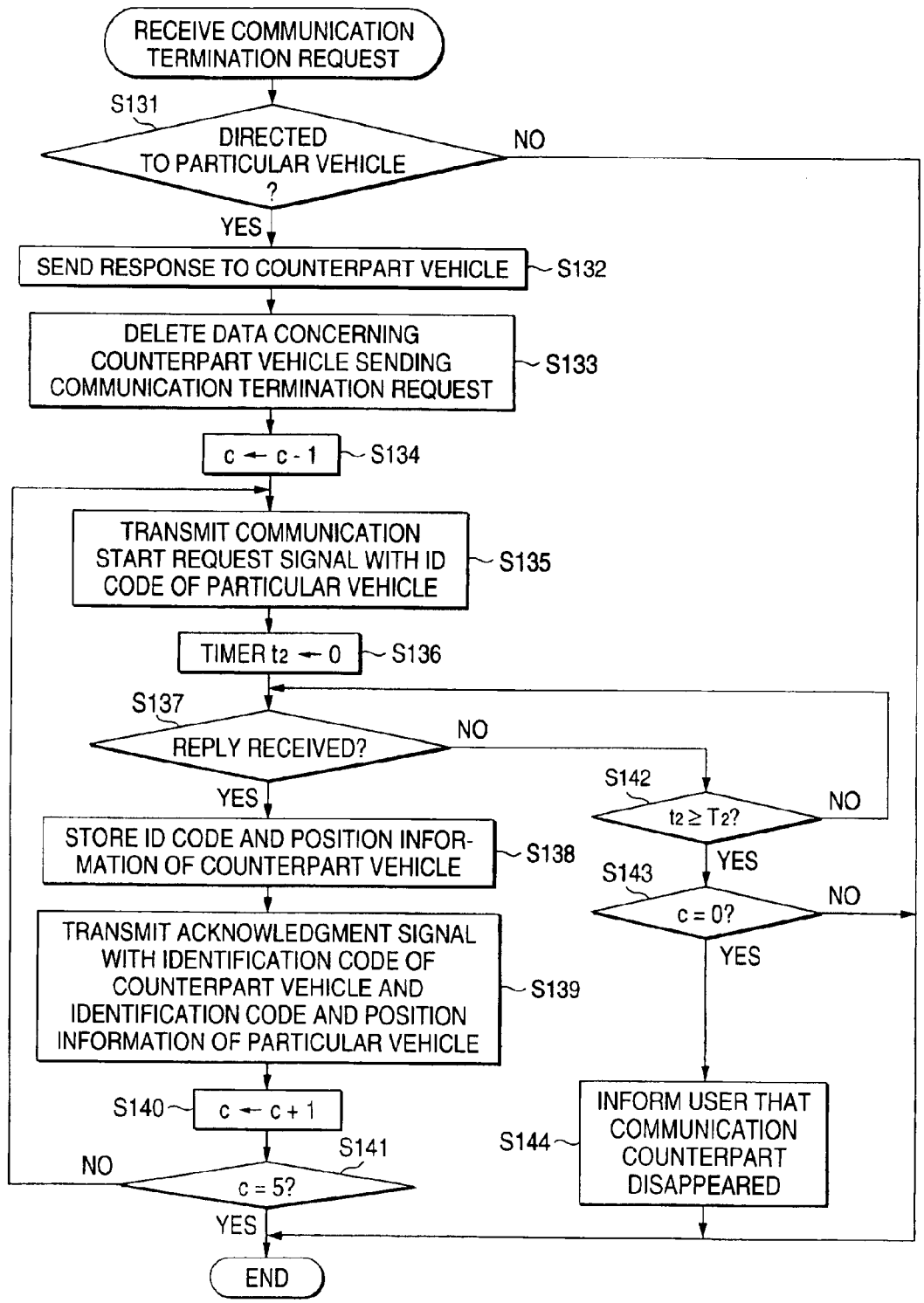
FIG. 16 is a flowchart to show processing operation of the microcomputer in the antitheft apparatus according to the first embodiment of the invention.

The processing operation performed upon reception of the communication termination request signal will be discussed later in detail based on a flowchart of FIG. 16. The counterpart vehicle Mb receiving the communication termination request signal transmitted from the particular vehicle Ma transmits a signal including the identification code of the particular vehicle Ma, which is a data communication counterpart with respect to the counterpart vehicle Mb and the identification code of the counterpart vehicle Mb itself (response signal to the communication termination request signal).

Next, it is determined whether or not a response to the communication termination request is received from the counterpart vehicle Mb (step S112). If it is concluded that a response to the communication termination request is received, the information concerning the counterpart vehicle Mb sending the response, namely, the data stored in the kth location of the table is deleted from the table (step S113) and the error count $E_k$ is set to 0 (step S114) and then the process returns to step S105.

If it is concluded at step S112 that a response to the communication termination request is not received, it is determined whether or not the timer $t_7$ indicates that a predetermined time period $T_7$ (for example, one second) has elapsed (step S115). If it is concluded that the timer $t_7$ indicates that the predetermined time period $T_7$ has not elapsed, the process returns to step S112 and a wait is made for a response to the communication termination request. On the other hand, if it is concluded that the timer $t_7$ indicates that the predetermined time period $T_7$ has elapsed, namely, a response error occurs, the error count $E_k$ is incremented by one (step S116). Then, it is determined whether or not the error count $E_k$ becomes $n_1$ (step S117).

If it is concluded that the error count $E_k$ becomes $n_1$, it is considered that theft of the particular vehicle Ma or the counterpart vehicle Mb stored in the kth location of the table occurs, and the information concerning the counterpart vehicle Mb stored in the kth location is transferred to another area in the RAM 5 (step S118), whereby the information is deleted from the table.

After the information is transferred, the error count $E_k$ is set to 0 (step S119). Next, a theft occurrence handling request is made (step S120) and then the process returns to step S105. When the theft occurrence handling request is made, the processing operation (5) previously described with reference to FIG. 8 is performed.

On the other hand, if it is concluded at step S117 that the error count $E_k$ is not $n_1$, a theft occurrence handling request need not be made at the current point in time, but it is necessary to again check whether or not a response error occurs. Therefore, a check necessity flag $f_2$ is set to 1 (step S121) and then the process returns to step S105.

If it is concluded at step S108 that the counter k exceeds 5, it means that the communication termination request is sent to all counterpart vehicles Mb stored in the table. Therefore, it is determined whether or not the check necessity flag $f_2$ is 1 (step S122).

If it is concluded that the check necessity flag $f_2$ is not 1, namely, it is not necessary to check whether or not a response error occurs, it means that the responses to the communication termination request are received from all counterpart vehicles Mb, and thus the processing operation (7) is terminated. On the other hand, if it is concluded that the check necessity flag $f_2$ is 1, namely, it is necessary to check whether or not a response error occurs, the check necessity flag $f_2$ is once restored to 0 (step S123) and the process returns to step S104 for again transmitting the communication termination request signal to the counterpart vehicles Mb corresponding to the information not deleted from the table.

Next, a processing operation (8) of the microcomputer 2 in the antitheft apparatus 1 according to the first embodiment will be discussed based on a flowchart of FIG. 16. The processing operation (8) is an operation performed when the communication termination request signal transmitted from a counterpart vehicle having the relationship of executing periodic data transfer (see step S110 in FIG. 15) is received through the communication unit 7.

It is determined whether or not the communication termination request is directed to the particular vehicle Ma based on the identification code contained in the communication termination request signal transmitted from the counterpart vehicle Mb (step S131). If it is concluded that the communication termination request is not directed to the particular vehicle Ma, the processing operation (8) is terminated. On the other hand, if it is concluded that the communication termination request is directed to the particular vehicle Ma, first the communication unit 7 is used to transmit a signal including the identification code of the counterpart vehicle Mb sending the communication termination request and the identification code of the particular vehicle Ma (reply signal) to report reception of the communication termination request to the counterpart vehicle Mb (step S132). Next, the information concerning the counterpart vehicle Mb sending the communication termination request is deleted from the table formed in the RAM 5 (see FIG. 3) (step S133) and the counter c is decremented by one (step S134).

Accordingly, one empty area occurs in the table and thus the communication unit 7 for a short range is used to transmit a communication start request signal to find a new counterpart vehicle Mb (step S135) and then the timer $t_2$ is set to 0 and is started (step S136). The purpose of finding a counterpart vehicle Mb and executing periodic data transfer is to detect occurrence of an emergency such as theft of the particular vehicle Ma, as described above.

Next, it is determined whether or not a reply to the communication start request, namely, a reply signal to the communication start request signal is received (step S137). If it is concluded that the reply signal is received, the identification code and position information of the vehicle transmitting the reply signal are stored in the empty area of the table formed in the RAM 5 (see FIG. 3) as the identification code and position information of the counterpart vehicle Mb as a counterpart for executing periodic data transfer (step S138).

Next, to report reception of the reply signal to the counterpart vehicle Mb, the communication unit 7 is used to transmit a signal including the identification code of the counterpart vehicle Mb and the identification code and the position information of the particular vehicle Ma (acknowledgement signal) (step S139). Accordingly, since the number of counterpart vehicles Mb increases by one, the counter c is incremented by one (step S140).

After the counter c is incremented by one, it is determined whether or not the counter c reaches 5 (step S141). If it is concluded that the counter c reaches 5, namely, the table formed in the RAM 5 is filled with data and the number of counterpart vehicles Mb stored in the table cannot be increased any more, the processing operation (8) is terminated. On the other hand, if it is concluded that the counter c does not reach 5, namely, is 4 or less and the table contains an empty area and the number of counterpart vehicles Mb stored in the table can be increased, the process returns to step S135 and again the communication start request signal is transmitted.

If it is concluded at step S137 that the reply signal to the communication start request is not received, it is determined whether or not the timer $t_2$ indicates that a predetermined time period $T_2$ (for example, one second) has elapsed is determined (step S142). If it is concluded that the timer $t_2$ indicates that the predetermined time period $T_2$ has not elapsed, the process returns to step S137 and a wait is made for the reply signal.

On the other hand, if it is concluded that the timer $t_2$ indicates that the predetermined time period $T_2$ has elapsed, namely, there is no vehicle making a reply to the request signal and a counterpart for executing periodic data transfer to and from the particular vehicle Ma does not exist any more, then it is determined whether or not the counter c is 0 (step S143). If it is concluded that the counter c is 0, namely, a counterpart for executing periodic data transfer disappeared and therefore occurrence of an emergency such as theft of the particular vehicle Ma cannot be detected, the mobile telephone 8 or the communication unit 7 is used to send a message indicating the fact to the user (step S144). On the other hand, if it is concluded that the counter c is not 0, the processing operation (8) is terminated.

According to the antitheft apparatus according to the first embodiment, data is transferred to and from the counterpart vehicle Mb, whereby it can be determined whether or not an emergency such as theft of the particular vehicle Ma or the counterpart vehicle Mb occurs. Further, if the emergency is detected, the detected emergency can be reported to emergency facilities of the police P, etc., so that if theft of the mobile unit, etc., occurs in any other than a parking lot in which a monitor camera, etc., is installed, rapid action can be taken for the theft.

Even if the emergency information cannot be sent directly to the emergency facilities from the particular vehicle Ma (first vehicle $Mc_1$), the emergency information can be sent to the emergency facilities through the second vehicle $Mc_2$, the third vehicle $Mc_3$, or the like, so that very high safety can be ensured.

In the antitheft apparatus according to the first embodiment, data is transferred to and from the counterpart vehicle Mb at regular intervals (here, every 10 seconds). The user may set any desired time interval through the operation unit 10, etc., or data may be transferred at irregular intervals rather than at regular intervals. In an antitheft apparatus according to another embodiment, it may be made possible to input information concerning the battery capacity and the data transfer timing may be set based on the remaining battery capacity.

The antitheft apparatus according to the first embodiment detects occurrence of an emergency such as theft of the particular vehicle Ma by transferring data to and from another vehicle Mx (for example, a mobile unit, such as an automobile, an autobicycle, or a bicycle) which should not move. The counterpart for executing data transfer is not limited to the mobile units.

For example, an antitheft auxiliary device having a function of transferring data to and from the particular vehicle Ma at regular or irregular intervals and making a response to a response request sent from the antitheft apparatus may be placed on an immobile unit such as a utility pole or a traffic light, and the immobile unit may be used as a counterpart for executing data transfer. The immobile unit can also be connected to a police, a security company, etc., by wire rather than radio, so that the effect of congestion of radio communications is not affected.

The produce according to the first embodiment of the invention may be revised for improvement. For example, when the described antitheft apparatus or antitheft auxiliary device is commercialized and is revised over several stages, it can be sufficiently considered that the data format used to transfer data between the apparatus (devices) will be changed. If it is made impossible to transfer data simply because the data format changes, there is the fear of largely degrading safety.

Then, an antitheft apparatus according to still another embodiment may include a unit for preparing data to be transmitted based on a header part of data transmitted from another antitheft apparatus, and the data prepared by the unit maybe transmitted to the another antitheft apparatus, whereby safety can be improved.

What is claimed is:

1. An antitheft apparatus installed in a mobile unit, for preventing the mobile unit from getting stolen, the antitheft apparatus comprising:
   a communication unit for short range communication;
   a communication control unit for transmitting and receiving data to and from a counterpart using the communication unit when the mobile unit is set in a security mode, wherein the communication control unit transmits a response request signal to the counterpart;
   a presence determination unit for determining as to whether or not another mobile unit being set in the security mode exists in a predetermined area, on the basis of a response signal to the response request signal from the counterpart; and
   an emergency handling unit for conducting a predetermined emergency process when the presence determination unit determines that another mobile unit does not exist in the predetermined area.

2. The antitheft apparatus according to claim 1, wherein the predetermined area is an area in a predetermined radius of the mobile unit.

3. The antitheft apparatus according to claim 1, wherein the predetermined area is an area in a predetermined radius of an antitheft auxiliary unit provided in an immobile unit.

4. The antitheft apparatus according to claim 1, further comprising:
   a communication start request unit for transmitting a communication start request signal to the counterpart using the communication unit; and
   a reply unit for transmitting a reply signal to the communication start request signal to the counterpart using the communication unit, when the communication start request signal is transmitted from the counterpart and the communication control unit accepts the communication start request signal.

5. The antitheft apparatus according to claim 1, further comprising:
   a communication termination request unit for transmitting to the counterpart a signal indicating a request for communication termination using the communication unit.

6. The antitheft apparatus according to claim 1, further comprising:
a response request timing setting unit for setting a timing of transmitting the response request signal, wherein:
the communication control unit transmits the response request signal to the counterpart in accordance with the set timing.

7. The antitheft apparatus according to claim 6, wherein the response request timing setting unit sets the timing on the basis of environmental information concerning the mobile unit.

8. The antitheft apparatus according to claim 1, wherein the presence determination unit determines that the another mobile unit does not exist in the predetermined area, when the response signal to the response request signal is not transmitted from the counterpart during a first predetermined time period.

9. The antitheft apparatus according to claim 8, further comprising:
a first time period setting unit for setting the first predetermined time period, wherein:
the presence determination unit makes the determination in accordance with the first predetermined time period set by the first time period setting unit.

10. The antitheft apparatus according to claim 1, wherein the presence determination unit determines that the another mobile unit does not exist in the predetermined area, when the response signal to the response request signal is not transmitted from the counterpart a predetermined number of times.

11. The antitheft apparatus according to claim 10, further comprising:
a number-of-times setting unit for setting the predetermined number of times, wherein:
the presence determination unit makes the determination in accordance with the predetermined number of times set by the number-of-times setting unit.

12. The antitheft apparatus according to claim 1, further comprising:
an identification code storage unit for storing an identification code which identifies the counterpart, wherein:
the communication control unit transmitting and receiving the data to and from the counterpart using the identification code stored in the identification code storage unit.

13. The antitheft apparatus according to claim 1, further comprising:
a security mode setting unit for setting the mobile unit in the security mode when the security mode setting unit determines that a second predetermined time period has elapsed since a user conducted a predetermined action.

14. The antitheft apparatus according to claim 13, further comprising:
a second time period setting unit for setting the second predetermined time period, wherein:
the security mode setting unit makes the determination in accordance with the second predetermined time period set by the second time period setting unit to set the mobile unit in the security mode.

15. The antitheft apparatus according to claim 1 further comprising:
a first security mode cancel unit for canceling the security mode when the first security mode cancel unit determines that a third predetermined time period has elapsed since a user conducted a predetermined action and the mobile unit is set in the security mode.

16. The antitheft apparatus according to claim 15 further comprising:
a third time period setting unit for setting the third predetermined time period, wherein:
the first security mode cancel unit makes the determination in accordance with the third predetermined time period set by the third time period setting unit to cancel the security mode.

17. The antitheft apparatus according to claim 1 further comprising:
a lock code storage unit for storing a lock code used to cancel the security mode; and
a second security mode cancel unit for canceling the security mode when a predetermined condition is satisfied, wherein:
the predetermined condition includes a condition that a code input by a user matches the lock code stored in the lock code storage unit.

18. The antitheft apparatus according to claim 17 further comprising:
a lock code rewrite unit for writing a new code input by the user into the lock code storage unit to update the lock code.

19. The antitheft apparatus according to claim 1, wherein the emergency handling unit notifies an occurrence of an emergency to the surroundings of the mobile unit when the presence determination unit determines that another mobile unit does not exist in the predetermined area.

20. The antitheft apparatus according to claim 1, wherein the emergency handling unit transmits a signal indicating an occurrence of an emergency to a periphery of the mobile unit using the communication unit, when the presence determination unit determines that the another mobile unit does not exist in the predetermined area.

21. The antitheft apparatus according to claim 18 further comprising:
a notification unit for notifying the occurrence of the emergency on the periphery of the mobile unit to surrounding of the mobile unit upon reception of the signal indicating the occurrence of the emergency.

22. The antitheft apparatus according to claim 1, further comprising:
a mobile unit communication device for wide range communication, wherein:
the emergency handling unit determines whether or not the mobile unit falls into an emergency, on the basis of mobile unit information concerning the mobile unit; and
the emergency handling unit transmits emergency information indicating that the mobile unit falls into the emergency to at least one of an emergency facility using the mobile unit communication device and a periphery of the mobile unit using the communication unit, when the emergency handling unit determines that the mobile unit falls into the emergency.

23. The antitheft apparatus according to claim 22, wherein the emergency information includes the mobile unit information.

24. The antitheft apparatus according to claim 23, wherein the counterpart is a plurality of counterparts, the antitheft apparatus further comprising:
a move direction calculation unit for calculating a move direction of the mobile unit on the basis of states of the response signals from the counterparts, wherein:
the mobile unit information included in the emergency information includes information concerning the move direction of the mobile unit calculated by the move direction calculation unit.

25. The antitheft apparatus according to claim 23, wherein the mobile unit information included in the emergency information includes run path information provided as position information accumulates.

26. The antitheft apparatus according to claim 1, wherein:
the emergency handling unit determines whether or not the another mobile unit falls into an emergency, on the basis of mobile unit information concerning the mobile unit; and
the emergency handling unit transmits emergency information indicating that the another mobile unit falls into the emergency to at least one of an emergency facility and a periphery of the mobile unit using the communication unit, when the emergency handling unit determines that the another mobile unit falls into the emergency.

27. The antitheft apparatus according to claim 26, further comprising:
an emergency information transmission unit for transmitting the emergency information to at least one of the emergency facility and the periphery of the mobile unit using the communication unit, when the mobile unit receives the emergency information.

28. The antitheft apparatus according to claim 27, wherein the emergency information transmission unit increments a count value and adds the incremented count value to the emergency information.

29. The antitheft apparatus according to claim 27, wherein the emergency information transmission unit determines whether or not the emergency information transmission unit transmits the emergency information on the basis of an elapsed time since a first transmission time of the emergency information.

30. The antitheft apparatus according to claim 27, wherein the emergency information transmission unit determines whether or not the emergency information transmission unit transmits the emergency information on the basis of distance between a first transmission point of the emergency information and a current position of the mobile unit.

31. The antitheft apparatus according to claim 1, further comprising
a data preparation unit for preparing data transmitted to the counterpart on the basis of a header part of data transmitted from the counterpart, wherein:
the communication control unit transmits the data prepared by the data preparation unit to the counterpart.

32. The antitheft apparatus according to claim 1 further comprising:
an information unit for informing a user that the counterpart to which the response request signal is to be transmitted does not exist, when it is determined that the counterpart does not exist.

33. An antitheft auxiliary device for transferring data to and from an antitheft apparatus including:
a communication unit;
a communication control unit for transmitting and receiving data to and from a counterpart using the communication unit when the mobile unit is set in a security mode, the communication control unit for transmits a response request signal to the counterpart;
a presence determination unit for determining as to whether or not another mobile unit being set in the security mode exists in a predetermined area, on the basis of a response signal to the response request signal from the counterpart; and
an emergency handling unit for conducting a predetermined emergency process when the presence determination unit determines that the another mobile unit does not exist in the predetermined area,
the antitheft auxiliary device provided in an immobile unit, the antitheft auxiliary device comprising:
a response unit for transmitting the response signal to the response request signal, when the response unit receives the response request signal from the antitheft apparatus.

34. The antitheft system comprising:
a plurality of antitheft apparatuses installed in mobile units; and
an antitheft auxiliary device provided in an immobile unit, wherein:
each of antitheft apparatuses includes:
a communication unit;
a communication control unit for transmitting and receiving data to and from the other antitheft apparatuses and the antitheft auxiliary device using the communication unit when the mobile unit is set in a security mode, the communication control unit for transmits a response request signal to the other antitheft apparatuses and the antitheft auxiliary;
a presence determination unit for determining as to whether or not another mobile unit being set in the security mode exists in a predetermined area, on the basis of a response signal to the response request signal from the other antitheft apparatuses and the antitheft auxiliary; and
an emergency handling unit for conducting a predetermined emergency process when the presence determination unit determines that the another mobile unit does not exist in the predetermined area; and the antitheft auxiliary device includes:
a response unit for transmitting the response signal to the response request signal, when the response unit receives the response request signal from the antitheft apparatuses.

* * * * *